United States Patent [19]

Ohashi et al.

[11] Patent Number: 4,733,145

[45] Date of Patent: Mar. 22, 1988

[54] DRIVE CONTROL SYSTEM FOR VEHICLE MOUNTED, ELECTRICALLY DRIVEN DEVICES

[75] Inventors: Masao Ohashi, Kariya; Tomio Yasuda, Kasukabe; Ryuji Iizawa, Tokyo; Kiyomi Hori, Kawasaki, all of Japan

[73] Assignees: Aisin Seiki Kabushiki Kaisha, Aichi; Fujitsu Ltd., Kanagawa, both of Japan

[21] Appl. No.: 882,108

[22] Filed: Jul. 3, 1986

[30] Foreign Application Priority Data

Jul. 11, 1985 [JP] Japan .............................. 60-152968
Jul. 12, 1985 [JP] Japan .............................. 60-153606

[51] Int. Cl.[4] .......................... H02P 7/68; G05D 3/10

[52] U.S. Cl. ...................................... 318/54; 318/466; 364/185; 364/424; 307/10 R; 307/140

[58] Field of Search .................. 318/53, 54, 256, 264, 318/265, 266, 282, 286, 466, 467, 468, 470, 283; 49/26, 28; 307/9, 10 R, 10 AT, 140; 364/424, 140, 185

[56] References Cited

U.S. PATENT DOCUMENTS 4,427,929 1/1984 Andrei-Alexandru et al. .... 318/282
4,450,390 5/1984 Andrei-Alexandru et al. .... 318/282
4,516,034 5/1985 Bier .................................. 307/10 R
4,608,637 8/1986 Okuyama et al. ............. 318/466 X

FOREIGN PATENT DOCUMENTS 1459206 4/1969 Fed. Rep. of Germany ...... 318/266

*Primary Examiner*—Bentsu Ro
*Attorney, Agent, or Firm*—Sughrue, Mion, Zinn, Macpeak & Seas

[57] ABSTRACT

A drive control system for driving an electrically driven window or sun roof is disclosed. A control unit drives a vehicle mounted device until it reaches a limit position when an ignition key is not inserted and when a door of the vehicle closes. Accordingly, a usual operation by a driver of the vehicle which occurs when he stops and gets out of the vehicle involves stopping the engine, withdrawing the ignition key, opening the door to get out of the vehicle, and closing the door. When it is desired to leave the window or sun roof in a half-open condition in order to prevent the parked car from overheating, the control unit stores any drive of a vehicle mounted device in response to an input when the ignition key is not inserted into the receptacle of the ignition switch, and controllably drives the vehicle mounted device until it reaches a limit position in response to a combination of the absence of the ignition key inserted into the receptacle, a closing of the door and the absence of stored information. Also an alarm unit is provided in combination with means which energizes the alarm unit whenever an induced current through a motor of a drive mechanism, when it is not energized, exceeds a given value. In this manner, an alarm is produced when a side window or sun roof is tampered open while the vehicle is parked.

30 Claims, 36 Drawing Figures

DRIVE CONTROL SYSTEM FOR VEHICLE MOUNTED, ELECTRICALLY DRIVEN DEVICES

BACKGROUND OF THE INVENTION

The invention relates to a system which is driven by an electric motor drive mechanism for controlling the position of a side window, roof panel, seat and mirrors, and also for detecting any abnormality thereof.

In certain vehicles, devices such as a side window including windows located on the opposite sides of a driver's seat and windows located on the opposite sides of a rear seat, a sun roof or roof panel, a seat and mirrors, which are disposed either internally or externally of the vehicle are electrically driven. An electric drive mechanism is provided including a motor associated with a control circuit which may be located in response to a switch operatio to energize the motor for rotation in either forward or reverse direction. An occupant of the vehicle must control the time over which the switch remains operated while monitoring the condition of each device. In particular, where a device is to be driven through a very small stroke, it is difficult to operate the switch for a precisely controlled time interval, while where a device is to be driven through an increased stroke, a driver of the vehicle cannot be freed from the switch, presenting a difficulty in driving the vehicle.

To accommodate for this, there is proposed an arrangement, including a separate switch having a limited energization time interval, and another arrangement including a self-holding circuit associated with the control circuit for the motor. In this manner, the switch having a limited energization time may be operated where a particular device is to be driven throgh a small stroke while when another device is to be driven through an increased stroke, a switch which activates the self-holding circuit may be operated.

A system for driving vehicle mounted devices which includes a motor drive mechanism is usually turned on or off by an ignition key switch. Accordingly, when the ignition key is withdrawn, these devices can no longer be driven. For example, when parking a vehicle, a driver or occupant may withdraw the ignition key, get out of the vehicle, and lock the door. He may then become aware of the fact that he has forgotten to close either a side window or the sun roof. In this instance, he must unlock the door, insert the ignition key to enable a required switch operation in order to close the side window or sun roof which may have been left open and then withdraw the ignition key, get out of the vehicle and again lock the door. It will be seen that any mistake in performing such procedure of operations results in a significant reduction convenience. It is also possible that the driver may have left the vehicle while being unaware of having forgotten or close the side window or sun roof. Accordingly, the vehicle may be subject to weather or theft.

To overcome such inconveniences, Japanese Patent Publication No. 22,763/1982 discloses an electrically driven sun roof including means for detecting the open or closed condition of a sun roof. Further means are provided for detecting whether an engine key is in a position to close the sun roof when it is determined that the sun roof is open. Also, Japanese Laid-Open Patent Application No. 36,119/1980 discloses a window power drive system in which switch means closes when an engine key is in the off position and another switch means which closes when the door is locked are connected in series with a supply line connected to a motor of the mechanism. In the former, if the sun roof is open when the engine key is withdrawn, the sun roof can be automatically closed, thus positively preventing a failure of closing the sun roof. In the latter, if there is a window which remains open when the driver has withdrawn the engine key, got out of the vehicle and locked the door this window can be automatically closed.

Considering a mechanism which is used in a side window or sun roof, it will be seen that such mechanism generally comprises a transmission mechanism including gears and wires or the like for connection with the motor. Thus, the side window or sun roof can be opened by tampering with the mechanism. When a hand is put through an opening that is tampered, a knob for a door lock which is located within the vehicle is accessible. Accordingly, either the vehicle or goods disposed within the vehicle may be subject to theft.

To prevent such casualty, there is proposed an anti-theft apparatus which issues an alarm whenever a door lock knob disposed within a vehicle is operated before a door is opened or which issues an alarm in response to the detection of an oscillation of the vehicle or a change in the electrical potential of the body. With such approach, oscillations which are produced when an electrically driven device such as side window or sun roof is tampered with, can trigger an alarm, and also a knob operation for a door lock located within the vehicle also triggers an alarm, preventing such casualty.

Each of the arrangements described above is effective to solve a particular problem for which it is intended. However, it must be noted that problems relating to an electrically driven device are compounded. For example, considering a side window, it usually requires a first switch which limits the duration of energization of a motor, a normal on/off switch and a self-holding switch. If the vehicle has four doors, the number of parts increases in a corresponding manner.

It will be seen that a side window or sun roof may be left slightly open in order to prevent an excessive temperature rise within the vehicle when the vehicle is parked outdoors on a hot summer day. With the prior art arrangements as mentioned above, such side window or sun roof will be closed independently from the intent of the driver, based on the recognition that such element has been mistakenly left open. Accordingly, to prevent such inconvenience, there must be provided separate switch means which prevents a failure-to-close preventing apparatus from operating. On the contrary, if such separate switch means is left activated, the failure-to-close preventing apparatus is prevented from operating. In the event a failure actually occurs to close if the side window or sun roof is left slightly open in order to prevent an excessive temperature rise within the vehicle, a thin instrument, hand or finger may be inserted through the slight clearance to tamper with the side window or sun roof.

To summarize, if it is attempted to improve the operation of vehicle mounted devices such as the side window or sun roof, to prevent the failure to close and to prevent the tampering operation with the prior art approach, it is necessary to include every means described above in combination and to add any wanting capability, resulting in an enormous increase in the number of parts to cause an increase in the cost and a degradation in the reliability. Such combination added with wanting capability is still incapable of solving the fundamental problem such as the failure to close a side window due to an improper operation of switch means which disables the failure-to-close preventing apparatus.

SUMMARY OF THE INVENTION

It is a primary object of the invention to prevent a failure to close a side window or sun roof without requiring any special operation, and a second object to prevent casualty caused by tampering with a side window or sun roof.

The above objects are accomplished in accordance with the invention by a driven control system for controllably driving a vehicle mounted device which is supported in a movable manner in accordance with an input. The driven control system drives a vehicle mounted device until it reaches a limit position when an ignition key is not inserted into the ignition switch and when a door on the vehicle closes. In this manner, a window is closed or a sun roof is closed in response to a usual operation conducted by a driver of a vehicle when he ceases to use the vehicle and gets out of the vehicle. Namely stopping the engine, withdrawing the ignition key, opening the door to get out of the vehicle and closing the door again. In this manner, no particular operation is required on the part of the driver.

When a vehicle mounted device is driven in response to an input without the ignition key being inserted into the ignition switch, such drive is stored by the control system. The control switch operates to controllably drive the vehicle mounted device until it reaches a limit position when the ignition key is not inserted into the ignition switch and, the door closes. Accordingly, if the window or sun roof is driven to a desired position after withdrawing the ignition key, the window or sun roof can be maintained in that position if the door is subsequently opened to allow the driver to get out of the vehicle and close the door. This will prevent the parked car from overheating.

Tampering with the side window or sun roof can be prevented by providing an alarm unit and means for energizing the alarm unit when an electromotive force of a motor of the drive mechanism, when not energized, exceeds a given value.

The above and other objects and features of the invention will become apparent from the following description of an embodiment thereof with reference to the drawings.

DETAILED DESCRIPTION OF EMBODIMENT

Figure 1A:
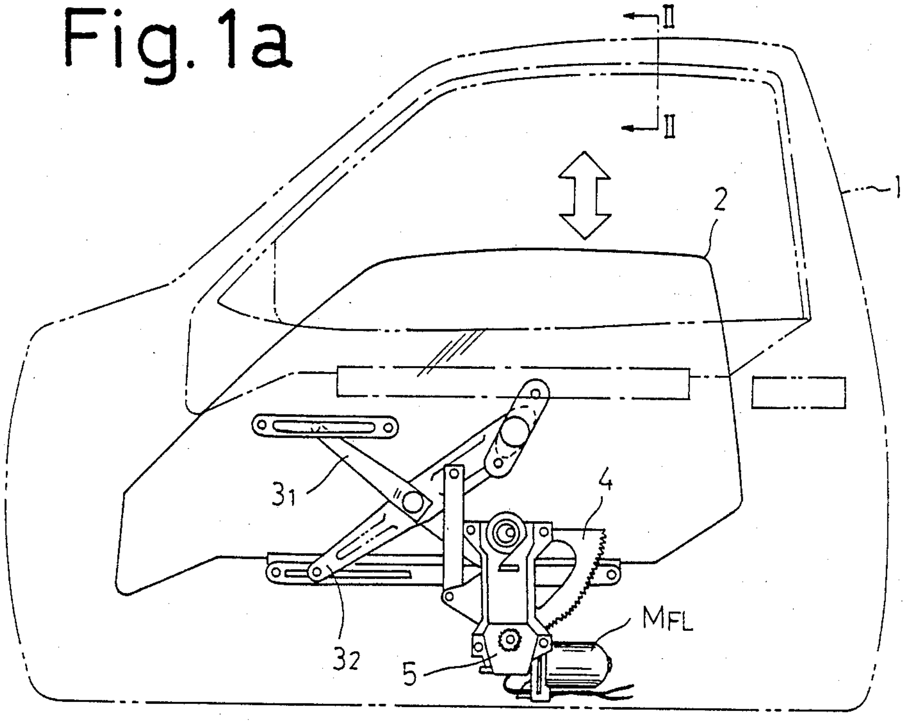
FIG. 1*a* is a side elevation of a mechanism according to one embodiment of the invention, specifically, illustrating an electrically driven window opening and closing mechanism disposed adjacent to an assistant driver's seat of an automobile.
Figure 1B:
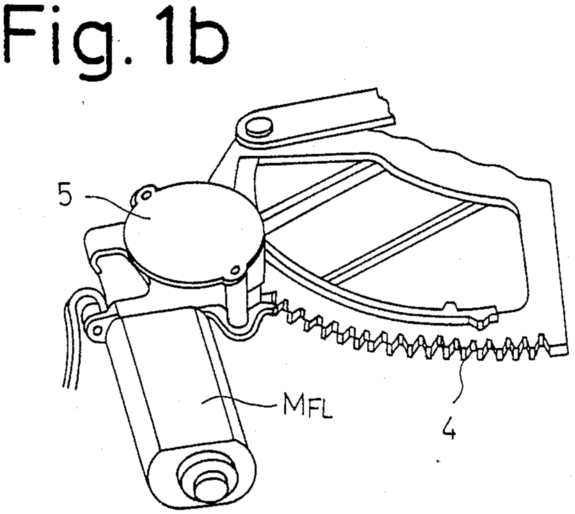
FIG. 1*b* is an enlarged perspective view of part of the mechanism shown in FIG. 1*a;*

FIG. 1*a* shows an electric drive mechanism which drives a glass pane 2 up and down, for a door 1 adjacent to an assistant driver's seat, or front passenger seat, (FL seat) of an automobile. A pair of upper and lower guide rails are secured to the glass pane 2, and are engated by pins located on one end of a pair of link arms $3_1$, $3_2$. A sector-shaped gear 4 is coupled to an elevating arm, engaged with the other end of the link arm $3_2$, for driving it up and down. The sector-shaped gear 4 meshes with a wheel of a worm wheel assembly 5, and the wheel is in meshing engagement with a worm which is coupled with the rotary shaft of an electric motor $M_{FL}$. The combination of the gear 4 and the worm wheel assembly 5 is illustrated in FIG. 1*b*. When the motor $M_{FL}$ rotates in the forward direction, the resulting rotation is transmitted through the worm wheel assembly 5 to rotate the sector-shaped gear 4 clockwise as viewed in FIG. 1*a*, thus driving the glass pane 2 upward. When the motor $M_{FL}$ rotates in the reverse direction, the resulting rotation is similarly transmitted through the worm wheel assembly 5 to rotate the gear 4 countercloskwise in FIG. 1*a*, thus lowering the glass pane 2.

Figure 2:
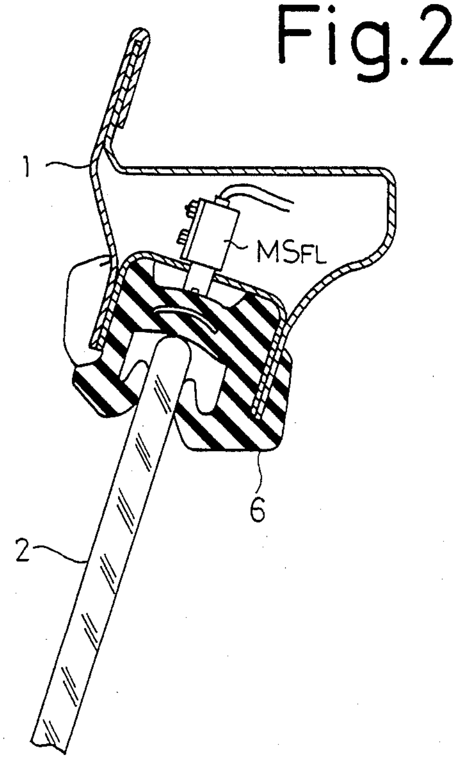
FIG. 2 is a cross section taken along the line II—II shown in FIG. 1*a;*

FIG. 2 shows a cross section taken along the line II—II shown in FIG. 1*a*. As shown, a door frame located at the top of the door 1 has a hollow space in which a limit switch $MS_{FL}$ is disposed for purpose of detecting the position. The switch $MS_{FL}$ has a switch knob which projects through the door frame into the hollow space within a weather strip 6, and has an elevation which is below the edge of the door frame. When the glass pane 2 assumes its lower position or when the window is open, the switch contact of the switch $MS_{FL}$ is closed. When the motor $M_{FL}$ is energized for rotation in the forward direction, the glass pane 2 moves upward, and its front end moves into abutment against the weather strip 6. A continued energization in the forward direction causes the front end of the glass plane 2 to advance into the door frame, compressing the weather strip 6 to drive the switch knob of the switch $MS_{FL}$ upward. Thereupon, the switch $MS_{FL}$ becomes open or becomes non-conductive. The glass pane 2 can be further driven upward through a given small distance beyond such position, which is chosen to be less than the play of the switch knob, thus reaching a completely closed condition. In this manner, the limit switch $MS_{FL}$ detects the location assumed by the glass pane 2 immediately before complete closure.

As is well recognized, the motor current has a proportional relationship with respect to a mechanical load thereon. Accordingly, when the motor $M_{FL}$ is energized for rotation in the forward direction to drive the glass panes 2 upward, and before the front end of the glass pane 2 abuts against the weather strip 6, the load on the motor is low, and hence the motor current is low. However, when the glass pane 2 moves upward and abuts against the weather strip 6, compressing it as shown in FIG. 2, the load on the motor increases as does the motor current. When it fully compresses the weather strip 6, the motor drive mechanism ceases to move, and the load on the motor increases to infinity, causing a rapid increase in the motor current.

Figure 3:
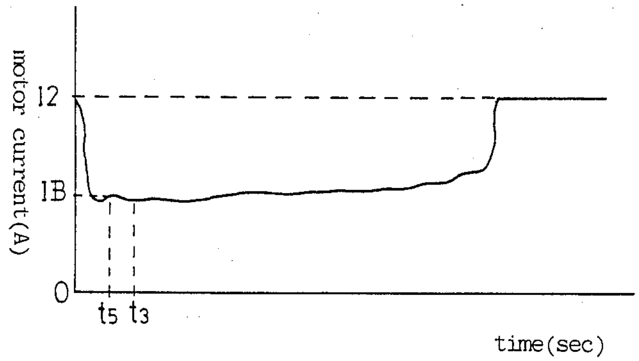
FIG. 3 graphically shows a current which energizes an electric motor driving a window glass pane as the latter moves upward.

The described change in the motor current is graphically shown in FIG. 3. The curve shown indicates a change in the current of the motor $M_{FL}$ when it drives the glass pane 2 from its full window open to its full window closed condition. Friction associated with a glass running and oscillations of the vehicle influence upon the mechanism load, which does not remain constant, thus causing an oscillating change in the motor current. It will be noted that a motor current of a relatively high magnitude occurs during a time interval from the initiation of the energization until the motor reaches its steady state rotation, or during an acceleration period. The same applies when the motor $M_{FL}$ is energized for rotation in the reverse direction to lower the glass pane 2. In this instance, the load on the motor will be reduced as a result of the weight of the glass pane 2, but a motor current of a relatively high magnitude occurs during an acceleration period until the motor reaches its steady state rotation, producing a substantially constant current flow when it drives the glass pane 2 downward at a uniform rate. When the glass pane 2 reaches its lowermost position and cannot be driven further downward (fully open position), the motor current increases rapidly.

It is to be noted that a similar motor drive mechanism is associated with each of the three remaining doors associated with the driver's seat and the opposite sides of the rear seat. Motors used in these drive mechanisms will be designated by $M_{FR}$, $M_{RR}$ and $M_{RL}$, respectively, and the associated limit switches are designated by $MS_{FR}$, $MS_{RR}$ and $MS_{RL}$, respectively. The motor current in each of these drive mechanisms exhibit a similar response as graphically shown in FIG. 3.

Figure 4A:
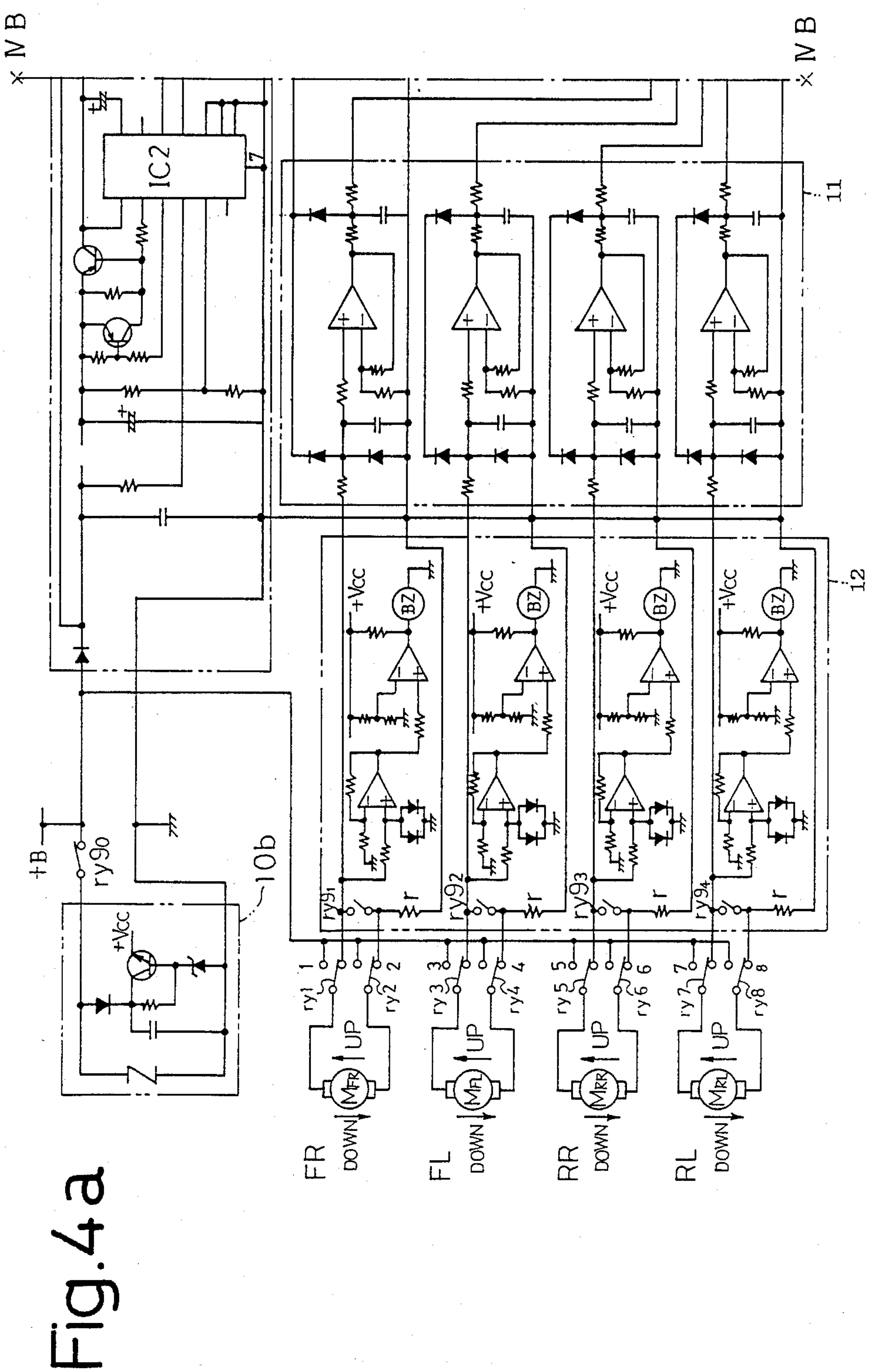
FIGS. 4*a* and 4*b* are block diagrams of an electrical control system which controls the energization of the window opening and closing mechanism by reading switch entry, both Figures are joined together by aligning the line IVB—IVB shown in FIG. 4*a* with the line IVA—IVA shown in FIG. 4*b;*
Figure 4B:
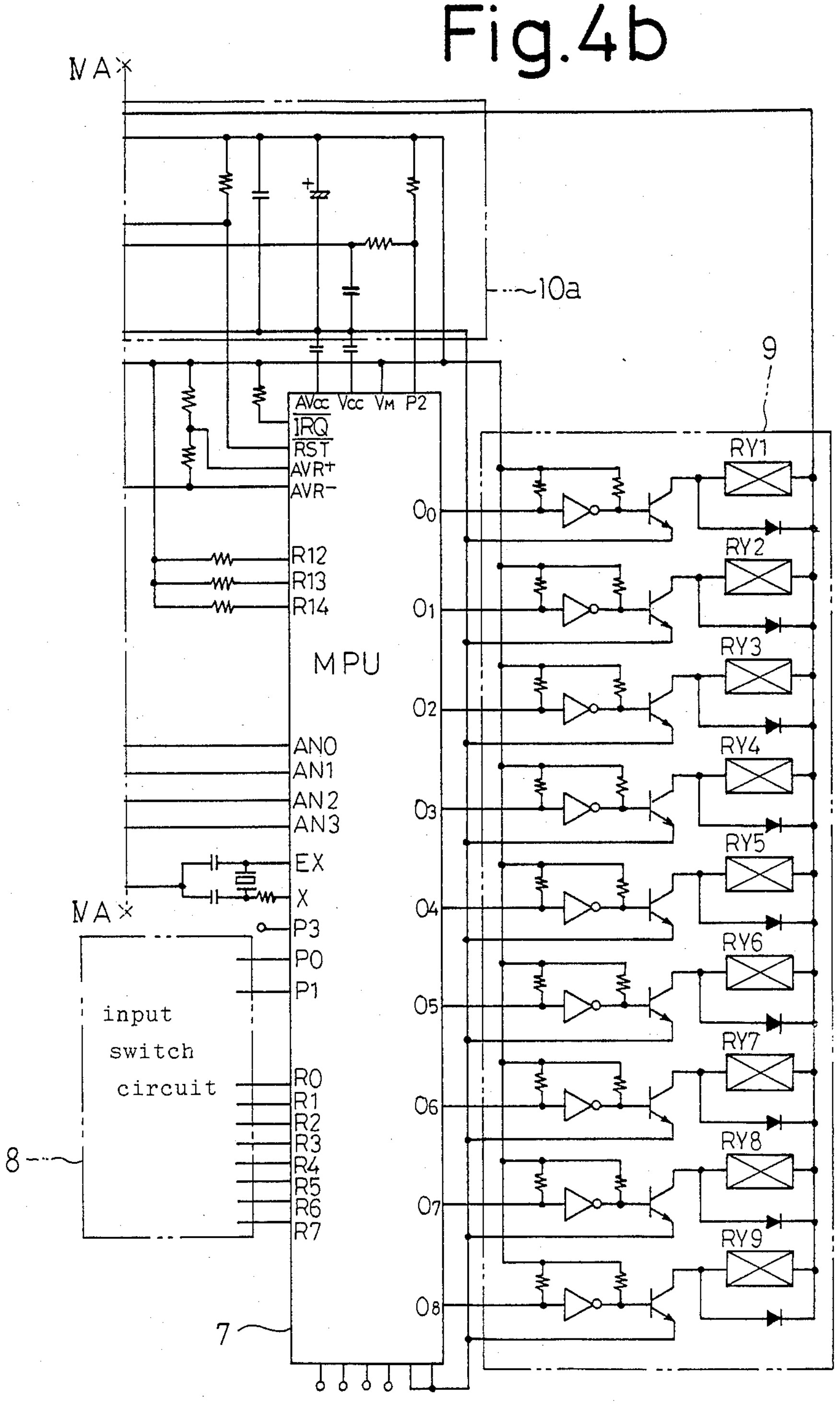

FIGS. 4*a* and 4*b* illustrate an electric control system which controls the energization of the electrical drive mechanisms associated with the four doors mentioned above. The electrical control system essentially comprises a microcomputer (MPU) 7, an input switch circuit 8, a drive circuit 9, power supply circuits 10*a*, 10*b*, a current detector circuit 11 and a theft preventing circuit 12.

Figure 5A:
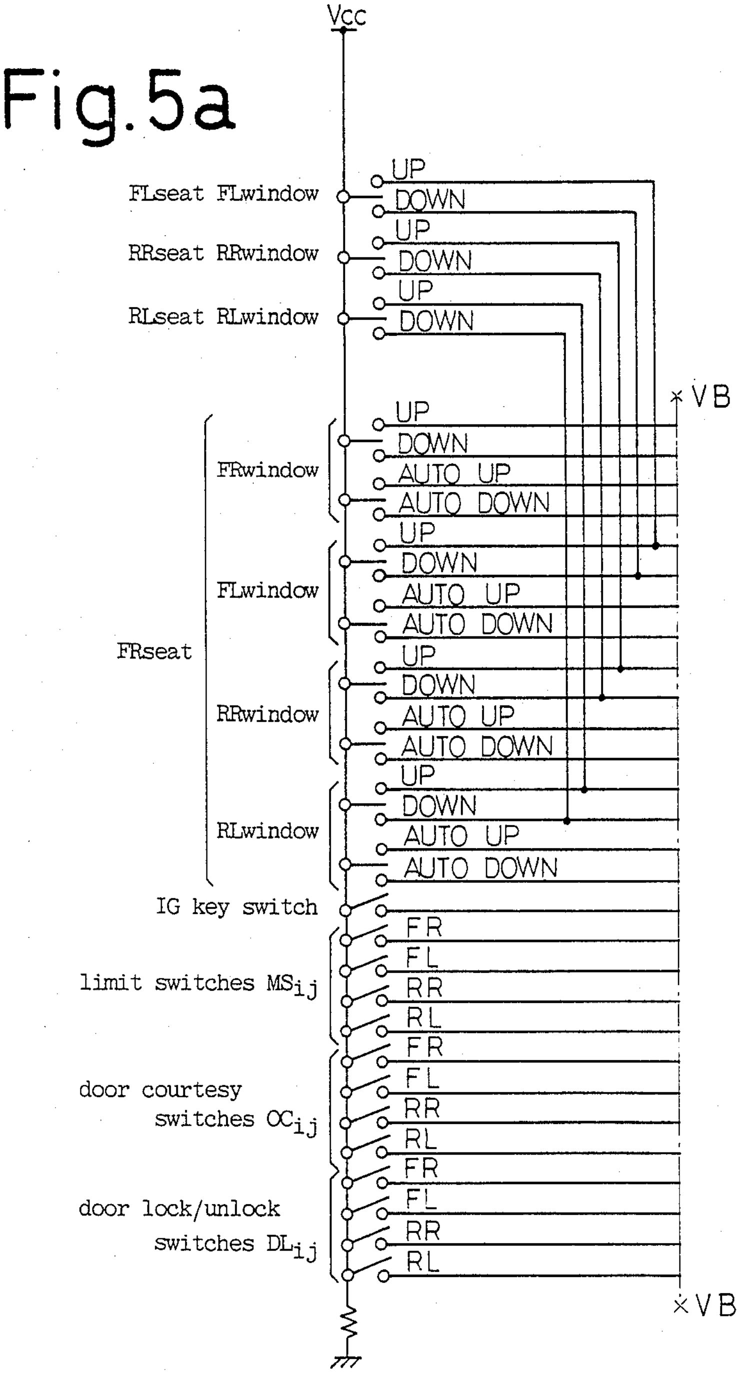
FIGS. 5*a,* 5*b,* and 5*c* illustrate a detailed circuit diagram of an input switch circuit shown in FIGS. 4*a* and 4*b,* which circuit is completed by joining the line VB—VB of FIG. 5*a* to the line VA—VA of FIG. 5*b* and joining the line VC—VC of FIG. 5*b* to the line VB—VB of FIG. 5*c;*
Figure 5B:
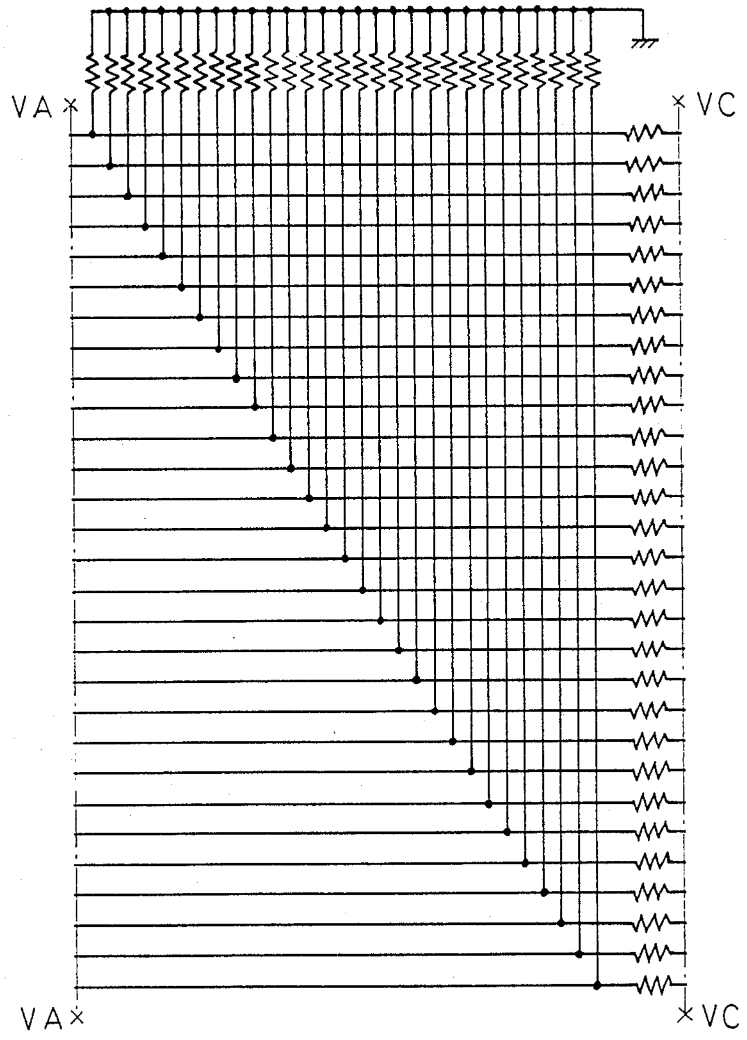
Figure 5C:
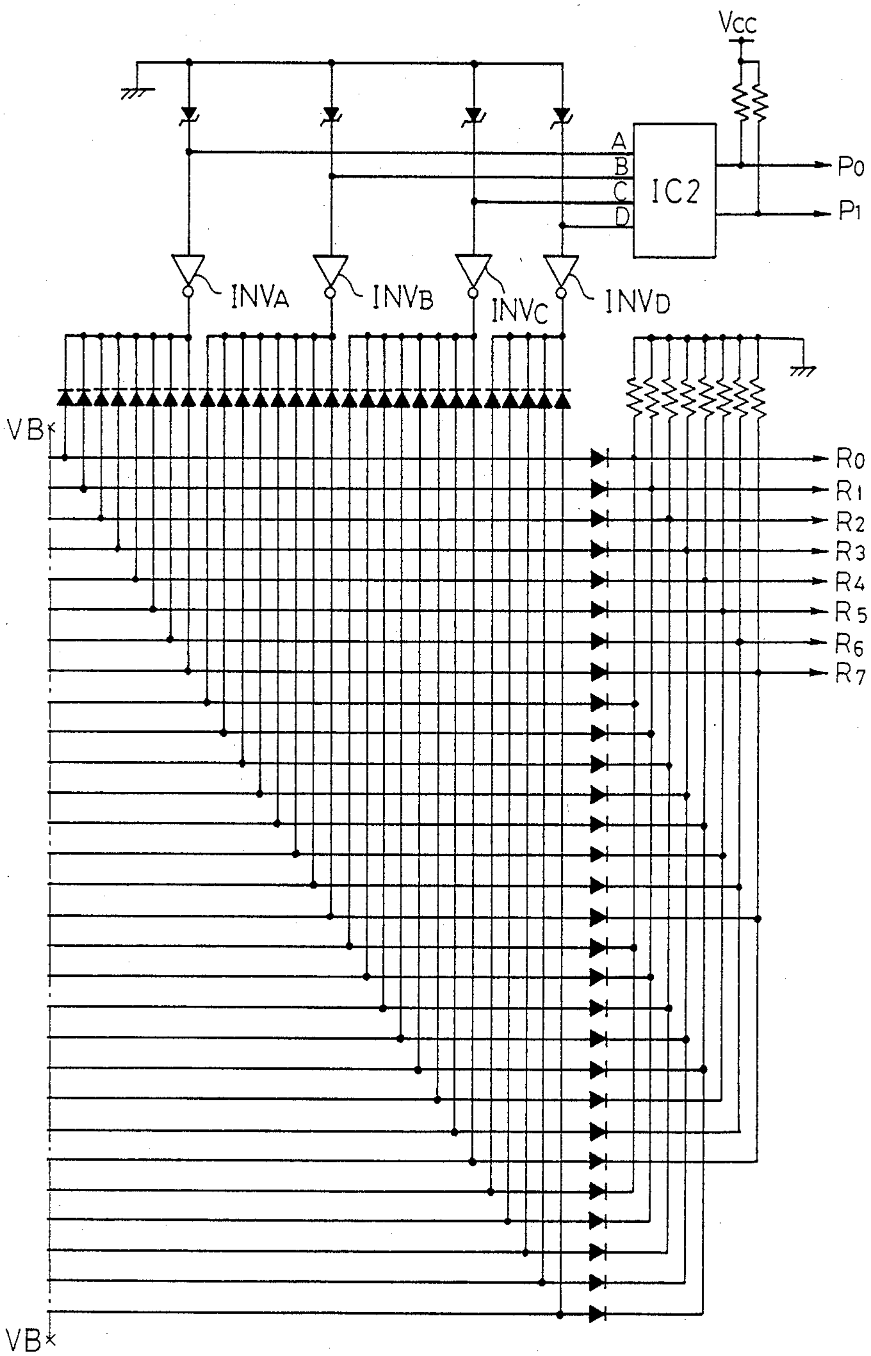

MPU 7 includes input ports R0 to R7 and output ports P0, P1 which are connected to the input switch circuit 8. The detail of the input switch circuit 8 is shown in FIGS. 5*a*, 5*b*, and 5*c*. The input switch circuit includes a switch group (see FIG. 6*a*) disposed on the arm rest of the door adjacent to the driver's seat (FR seat), including an FR window up/down switch, an FR window automatic up/down switch, an FL window (the window adjacent to the assistant driver's seat) up/-down switch, an FL window automatic up/down switch, an RR window (the window adjacent to the seat located immediately behind the driver's seat) up/down switch, an RR window automatic up/down switch, an RL window (the window adjacent to the seat which is located immediately behind the assistant driver's seat) up/down switch, and an RL window automatic up/-down switch; a position detecting limit switch $MS_{FR}$ disposed on the door frame of FR seat, an FR seat door open/close detecting courtesy switch $OC_{FR}$ disposed on a right-hand center body pillar (not shown), an FR seat door lock/unlock detecting switch $DL_{FR}$; an FL window up/down switch (see FIG. 7*a*) disposed on the inner panel of the door adjacent to the assistant driver's seat (FL seat), a position detecting limit switch $MS_{FL}$ (see FIG. 2) disposed on the door frame of the FL seat, an FL seat door open/close detecting courtesy switch $OC_{FL}$ disposed on a left-hand center body pillar (not shown), an FL seat door lock/unlock detecting switch $DL_{FL}$; an RR window up/down switch disposed on the inner panel of the door adjacent to the RR seat (the seat located immediately behind the driver's seat), a position detecting limit switch $MS_{RR}$ disposed on the door frame of the RR seat, an RR seat door open/close detecting courtesy switch $OC_{FL}$ disposed on a right-hand quarter lock piller (not shown), an RR seat door lock-/unlock detecting switch $DL_{RR}$; an RL window up/-down switch disposed on the inner panel of the RL seat (the seat located immediately behind the assistant driver's seat), a position detecting limit switch $MS_{RL}$ disposed on the door frame of the RL seat, an RL seat door open/close detecting courtesy switch $OC_{RL}$ disposed on a left-hand quarter lock pillar (not shown), an RL seat door lock/unlock detecting switch $DL_{RL}$; and IC key switch disposed in a receptacle (not shown) for an ignition key for detecting the presence or absence of an ignition key.

In FIG. 5*a*, the limit switches are designated as $MS_{ij}$, the door courtesy switches are designated as $OC_{ij}$ and the door lock/unlock switches are designated as $DL_{ij}$ where the suffix "i" indicates either F or R while the suffix "j" indicates either R or L.

Figure 6A:
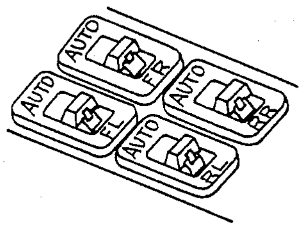
FIG. 6*a* shows the appearance of a switch group disposed on an arm rest of a door adjacent to a driver's seat for commanding opening or closing of a door.
Figure 6B:
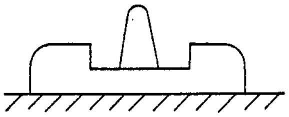
FIG. 6*b* is a left-hand side elevation of one of the combinatorial switches in its normal condition.
Figure 6C:
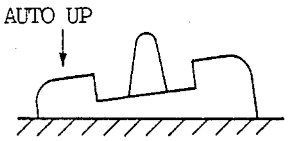
FIGS. 6*c,* 6*d,* 6*e* and 6*f* are left-hand side elevations, illustrating different operated conditions of the switch.
Figure 6D:
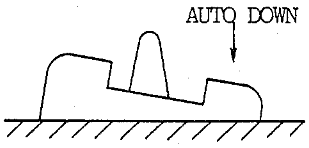

The appearance of the switch group disposed on the arm rest of the FR seat or the driver's seat is shown in FIG. 6*a*. In this group, a combinatorial switch for commanding to open or close the FR window, and similar combinatorial switches for the FL, RR and RL windows are disposed in a manner corresponding to the location of the respective windows. In each combinatorial switch, the outer switch comprises an automatic up/down switch while the inner switch comprises an up/down switch, each of which represents a two-pole switch.

FIGS. 6*b* to 6*f* indicate the operative conditions of one of the switches shown in FIG. 6*a*, specifically, the combinatorial switch for the FR window, in left-hand side elevation. Specifically, in FIG. 6*b*, the switch is shown in its normal condition where the outer, automatic up/down switch assumes a horizontal position while the inner up/down switch assumes a vertical position. When the outer switch is depressed at its end indicated as "AUTO UP", the switch rotates into a position shown in FIG. 6*c* where its movable contact moves into contact with a fixed contact, which commands an automatic up operation of the FR window (or specifically fixed contact AUTO UP for the FR window shown in FIG. 5*a*). When the switch is released, a spring which is internally housed therein causes the switch to be returned to its normal condition shown in FIG. 6*b*. When the outer switch is depressed at its end indicated by an "AUTO DOWN", the switch rotates into a position shown in FIG. 6*d* where the movable contact moves into contact with a fixed contact, which commands an automatic down operation for the FR window (or specifically fixed contact AUTO DOWN for the FR window shown in FIG. 5*a*). When the switch is released, the spring again returns the switch to its normal condition shown in FIG. 6*b*. In the normal condition, the movable contact assumes a neutral position where it does not engage either fixed contact.

Figure 6E:
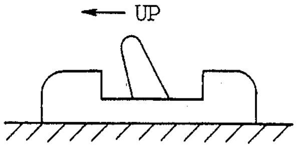
Figure 6F:
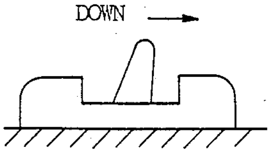

When the inner up/down switch is thrown to the "up" side, it tilts as shown in FIG. 6*e* where the movable contact moves into contact with a fixed contact, which commands an up operation of the FR window (or specifically fixed contact UP for the FR window shown in FIG. 5*a*). When the switch is released, the spring returns the switch to the normal condition shown in FIG. 6*d*. When the inner switch is tilted to the "down" side, it rotates to a position shown in FIG. 6*f* where the movable contact moves into contact with a fixed contact, which commands a down operation of the FR window (or specifically fixed contact DOWN for the FR window shown in FIG. 5*a*). When the switch is released, the spring again returns the switch to the normal condition shown in FIG. 6*b*. In the neutral position, the movable contact engages neither fixed contact. Other combinatorial switches shown in FIG. 6*a* are constructed in an identical manner.

Figure 7A:
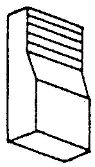
FIG. 7*a* shows the appearance of a switch disposed on an inner panel of a door adjacent to a driver's seat for commanding an opening or closing of a window.
Figure 7B:
FIGS. 7*b,* 7*c* and 7*d* are side elevations, illustrating a normal and an operated condition of the switch.
Figure 7C:
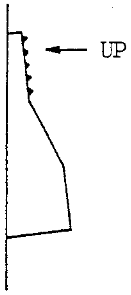
Figure 7D:
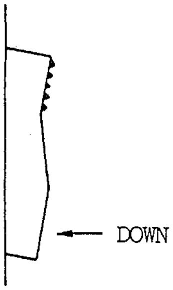

The appearance of the up/down switch adjacent the FL seat (assistant driver's seat) is shown in FIG. 7*a*. A side elevation of the switch in its normal condition is shown in FIG. 7*b*. Referring to FIG. 7*b*, an operating surface of the switch is offset, with the lower surface being embossed. When the embossed face is depressed, the switch rotates into a position shown in FIG. 7*c* where the movable contact moves into contact with the fixed contact commanding a down operation for the FL window (or specifically, fixed contact UP of the FL window shown in FIG. 5*a*). When released, the switch returns to the normal condition shown in FIG. 7*b* under the resilience of an internal spring. On the contrary, when the raised surface is depressed, the switch turns to a position shown in FIG. 7*d* where the movable contact moves into contact with a fixed contact commanding a down operation of the FL window (or specifically, fixed contact DOWN of the FL window shown in FIG. 5*a*). When released, the switch again returns to the normal condition shown in FIG. 7*b* under the resilience of the internal spring. In the normal condition, the movable contact assumes a neutral position in which it engages neither fixed contact. This switch is mounted on the inner panel of the FL door so that the "up" side is located upside. Similar switches are mounted on the inner panels of the RR door (for RR window up/down switch) and the RL door (for RL window up/down switch).

In this manner, the FL window up/down switch, the RR window up/down switch and the RL window up/down switch function in an identical manner with the FL window up/down switch, RR window up/down switch and the RL window up/down switch contained within the switch group disposed adjacent to the FR seat, and accordingly, the fixed contacts UP and DOWN of these switches are connected in parallel to each other, as shown in FIG. 5*a*.

FIG. 5*c* shows a decoder IC2 having input terminals which are connected to the output ports P0 and P1 of the microcomputer (MPU) 7. The decoder IC2 is responsive to signals on the output ports P0 and P1 to select one of output terminals A to D to establish 0 (L level) thereon while providing 1 (H level) on the remaining output terminals. The relationship between the inputs and outputs is indicated in the Table 1 below.

TABLE 1

| inputs | | outputs | | | |
|---|---|---|---|---|---|
| $P_0$ | $P_1$ | A | B | C | D |
| 0 | 0 | 0 | 1 | 1 | 1 |
| 0 | 1 | 1 | 0 | 1 | 1 |
| 1 | 0 | 1 | 1 | 0 | 1 |
| 1 | 1 | 1 | 1 | 1 | 0 |

The output from each of the output terminals A, B, C and D is inverted by inverters $INV_A$, $INV_B$, $INV_C$ and $INV_D$, respectively. Accordingly, when the output terminal A assumes an L level (0), the output from the inverter $INV_A$ will b an H level (1), allowing the anode level of eight diodes which are connected in parallel to the output terminal of the inverter $INV_A$ to be established in accordance with the operation of the FR seat up/down switch, FR seat automatic up/down switch, FL seat up/down switch and FL seat automatic up/down switch. Conversely, when the output terminal A assumes H level (1), the output from the inverter $INV_A$ will be an L level (0), causing the anode level of the eight diodes which are connected in parallel to the output terminal of the inverter $INV_A$ to assume an L level independently from the switch operation. The same applies to the remaining output terminals B, C and D. In this manner, MPU 7 is capable of reading twenty-nine inputs from the input switch circuit through the eight input ports R0 to R7 by changing the level on the output ports P0 and P1. By way of example, the input port R0 is connected to the contact UP of the FR window up/down switch, the contact UP of the RR window up/down switch, the fixed contact of IC key switch and the fixed contact of RL courtesy switch in the input switch circuit. When the both output ports P0 and P1 are set to 0, the output from the inverter $INV_A$ will be an H level (1) while the outputs from the remaining inverters will be an L level (0), so that the up operation of the FR window or the presence of the depression at the "up" side (UP contact on/off) can be read.

Returning to FIGS. 4*a* and 4*b*, the microcomputer (MPU) 7 has output ports O0 to O8, which are connected to relay drivers of the drive circuit 9. Each relay driver essentially comprises an inverter and a switching transistor, and when the output port assumes an L level (0), the inverter inverts such level to render the switching transistor conductive, thus energizing its connected relay. When the output port O0 assumes an L level (0) to energize a relay RY1, its relay contact ry1 is closed for connection with the power supply +B, allowing a current flow through the motor $M_{FR}$ associated with the FR window in a direction indicated by an arrow DOWN, thus reversing the motor $M_{FR}$ or opening the window. When the output port O1 assumes an L level (0) to energize a relay RY2, its relay contact ry2 is closed for connection with the supply +B. As will be described later, a relay 9 is energized when controlling the opening or closing of each window, and hence its relay contact $ry9_1$ is closed, passing a current through the motor $M_{FR}$ associated the FR window in a direction indicated by an arrow UP, causing the motor $M_{FR}$ to rotate in the forward direction, thus closing the window.

Similarly, relay RY3 or RY4 is selectively energized to control the motor $M_{FL}$ associated with the FL window to rotate in either forward or reverse direction. Relay RY5 or RY6 is selectively energized to control the rotation of the motor $M_{RR}$ associated with the RR window in either forward or reverse direction. Relay RY7 or RY8 is selectively energized to control the rotation of the motor $M_{RL}$ associated with the RL window in either forward or reverse direction.

The motor current through each motor $M_{FR}$, $M_{FL}$, $M_{RR}$ and $M_{RL}$ is detected as a voltage drop across a detecting resistor r, and is fed through a low pass filter comprising resistors and a capacitor where oscillating components are removed. Subsequently, the voltage signal is amplified to be fed to analog input ports AN0 to AN3. As mentioned previously, during the time a window is being closed or when the motor is energized for rotation in the forward direction, the motor current will behave as shown graphically in FIG. 3, provided no abnormality prevails. When the upper end of the glass pane moves into the door frame and begins to compress the weather strip, the motor will be overloaded, rapidly increasing the motor current. The motor will also be overloaded to cause a rapid increase in the motor current if some object is held sandwiched between the glass pane and the door frame during the time the door is being closed. The limit switch $MS_{ij}$ will be turned off as a result of the compression of the weather strip in the former instance, but will be on in the latter instance since the weather strip is not compressed. Accordingly, MPU 7 determines the occurrence of an abnormality, indicating that some object is held sandwiched, and causes the window in question to be opened fully in response to a rapid increase in the motor current when the limit switch $MS_{ij}$ is on.

When the theft preventing circuit 12 is to be activated, an H level (1) is established at the output port O8 to deenergize a relay RY9. Relay RY9 includes one break contact $ry9_0$ and four make contacts $ry9_1$ to $ry9_4$. The theft preventing circuit 12 comprises four blocks, each comprising a motor, an amplifier circuit, a buzzer Bz and a buzzer driver. When the relay RY9 is deenergized, the relay contacts $ry9_1$ to $ry9_4$ are open, whereby the respective amplifier circuits operate to amplify the terminal voltage across the motors $M_{FR}$, $M_{FL}$, $M_{RR}$ and $M_{FL}$, to which they are connected. At this time, the relay contact $ry9_0$ is closed to supply a constant voltage Vcc from the power supply circuit 10*b* to the buzzer driver. Since the motors $M_{FR}$, $M_{FL}$, $M_{RR}$ and $M_{RL}$ are engaged with the respective glass panes, when these glass panes are forcibly open, the associated motors rotate, developing an electromotive force. The resulting terminal voltage is amplified, and when it exceeds a given value, the buzzer driver energizes the buzzer Bz. In this manner, if a window of the vehicle is forcibly opened, the buzzer provides a warning, thus preventing a theft of the vehicle which is going to take place in this manner.

It will be noted that the theft preventing circuit is activated when the vehicle is at rest and no charging of a battery takes place by the rotation of an engine, and accordingly this circuit is activated by deenergizing the relay RY in order to minimize the power dissipation. The relay contact $ry9_0$ is broken to disconnect the buzzer driver from the power supply when a window is either opened or closed in a normal manner, in order to prevent an unnecessary energization of the buzzer Bz.

A driver or an occupant of a vehicle can utilize the vehicle according to a procedure as summarized below:

A: A door lock of the vehicle is unlocked (door lock-/unlock switch on) and the door is opened (door courtesy switch on).

B. A driver or occupant gets into the vehicle, closes the door (door courtesy switch off) and locks the door (door lock/unlock switch off).

C: An ignition key is inserted into the receptacle (IG key switch on), and the engine is started.

D: A desired switch is operated to open or close the window by performing switch operations described under sub-paragraphs $D_1$ to $D_4$ below.

$D_1$: An up/down switch associated with a window which is desired to be opened is depressed or tilted at its down side (DOWN contact on), lowering the glass pane to a desired location.

$D_1'$: An up/down switch associated with a window which is desired to be opened is depressed or tilted in a succession of small strokes at its down side (DOWN contact on), thus lowering the glass pane in small increments (inching).

$D_2$: An up/down switch associated with a window which is desired to be closed is depressed or tilted at its up side (UP contact on), thus raising the glass pane to a desired location.

$D_2'$: An up/down switch associated with a window which is desired to be opened is depressed or tilted at its up side in a series of small strokes (UP contact on), thus raising the glass pane in small increments (inching).

$D_3$: An automatic up/down switch associated with a window which is to be opened fully is depressed at its automatic down side (AUTO DOWN contact on), thus fully opening the glass pane.

$D_4$: An automatic up/down switch associated with a window which is to be closed fully is depressed at its automatic up side (AUTO UP contact on), thus fully closing the glass pane.

E: The engine is stopped, and the ignition key is withdrawn (IG key switch off).

F: When it is desired to prevent a temperature rise within the vehicle when it is parked for a short time interval, a switch (up/down switch or automatic up/-down switch) which is required to operate a desired window is operated a single time alone, in the similar manner as mentioned under the paragraph D, thus opening or closing the window.

G: The vehicle door lock is unlocked (door lock/unlock switch on), opening the door (door courtesy switch on).

H: The driver or occupant gets out of the vehicle, closes the door (door courtesy switch off), and locks the door (door lock/unlock switch off), or locks the door (door lock/unlock switch off) and then gets out of the vehicle and closes the door (door courtesy switch off).

The microcomputer (MPU) 7 shown in FIG. 4*b* has an internal read-only memory (ROM) which stores a program for controlling the opening or closing of a window or windows, as indicated by the status of individual switches in the input switch circuit in the procedure utilized by the driver or occupant of the vehicle, and a program which detects any abnormality in the motor current. The control operation which takes place in accordance with these programs will be briefly summarized below in a manner corresponding to the procedure utilized by the driver or occupant of the vehicle is mentioned in the preceding paragraphs. It is to be understood that a small letter represents a control operation corresponding to the operation indicated by a corresponding capital letter.

a, b: A standby mode is establishied to read a switch entry, and the system waits for the IG key switch to be turned on. In the meantime, the relay RY9 is deenergized, activating the theft preventing circuit 12.

c: When it is detected that the IG key switch is turned on, the standby mode is terminated and the normal window open/close control mode is established. The relay RY9 is then energized, ceasing the operation of the theft preventing circuit 12.

d: Window control $d_1$: A motor corresponding to the operated switch is energized for rotation in the reverse direction as long as DOWN contact remains on.

$d_1'$: When the time length during which DOWN contact remains on is less than a preselected time, the motor corresponding to the operated switch is energized for rotation in the reverse direction for a very brief time internal.

$d_2$: The motor corresponding to the operated switch is energized for rotation in the forward direction as long as UP contact remains on. In the meantime, if an abnormality, indicating that some object is held sandwiched, is detected, an abnormality processing mode is established, and the motor is energized for rotation in the reverse direction. When the fully open condition of the door is detected, the motor is deenergized and the abnormality processing mode is terminated.

$d_2'$: When the time length during which UP contact remains on is less than a preselected time, the motor corresponding to the operated switch is energized for rotation in the forward direction for a very brief time interval. If the abnormality as described above is detected in the meantime, the abnormality processing mode is established and the motor is energized for rotation in the reverse direction, and when the fully open condition of the window is detected, the motor is deenergized and the abnormality processing mode is terminated.

$d_3$: When AUTO DOWN contact is turned on, the motor corresponding to the operated switch is energized for rotation in the reverse direction. When the fully open condition is detected, the motor is deenergized.

$d_4$: When AUTO UP contact is turned on, the motor corresponding to the operated switch is energized for rotation in the forward direction. If the abnormality as described above is detected in the meantime, the abnormality processing mode is established, and the motor is energized for rotation in the reverse direction. When the fully open condition is detected, the motor is deenergized, and the abnormality processing mode is terminated. If no abnormality is detected, the motor is deenergized upon detection of a fully closed condition.

e, f: When it is detected that the ignition key is off, a single operation mode is established for each of the windows. A control operation according to one of the sub-paragraphs $D_1$ to $D_4$ responsive to a switch operation is performed, and then the single operation mode for each window is terminated.

g, h: The on condition of the courtesy switch $OC_{FR}$ of the driver's seat is read, and if the off condition of this switch is read subsequently, a failure-to-close preventing mode is established. In this mode, the control operation according to the sub-paragraph $d_4$ is executed for any open window except for a window which is driven by the single operation mode since such condition is established in response to the intent of the driver. When the control operation which closes any open window in the failure-to-close preventing mode is completed, this mode is terminated and the standby mode is established.

Figure 8A:
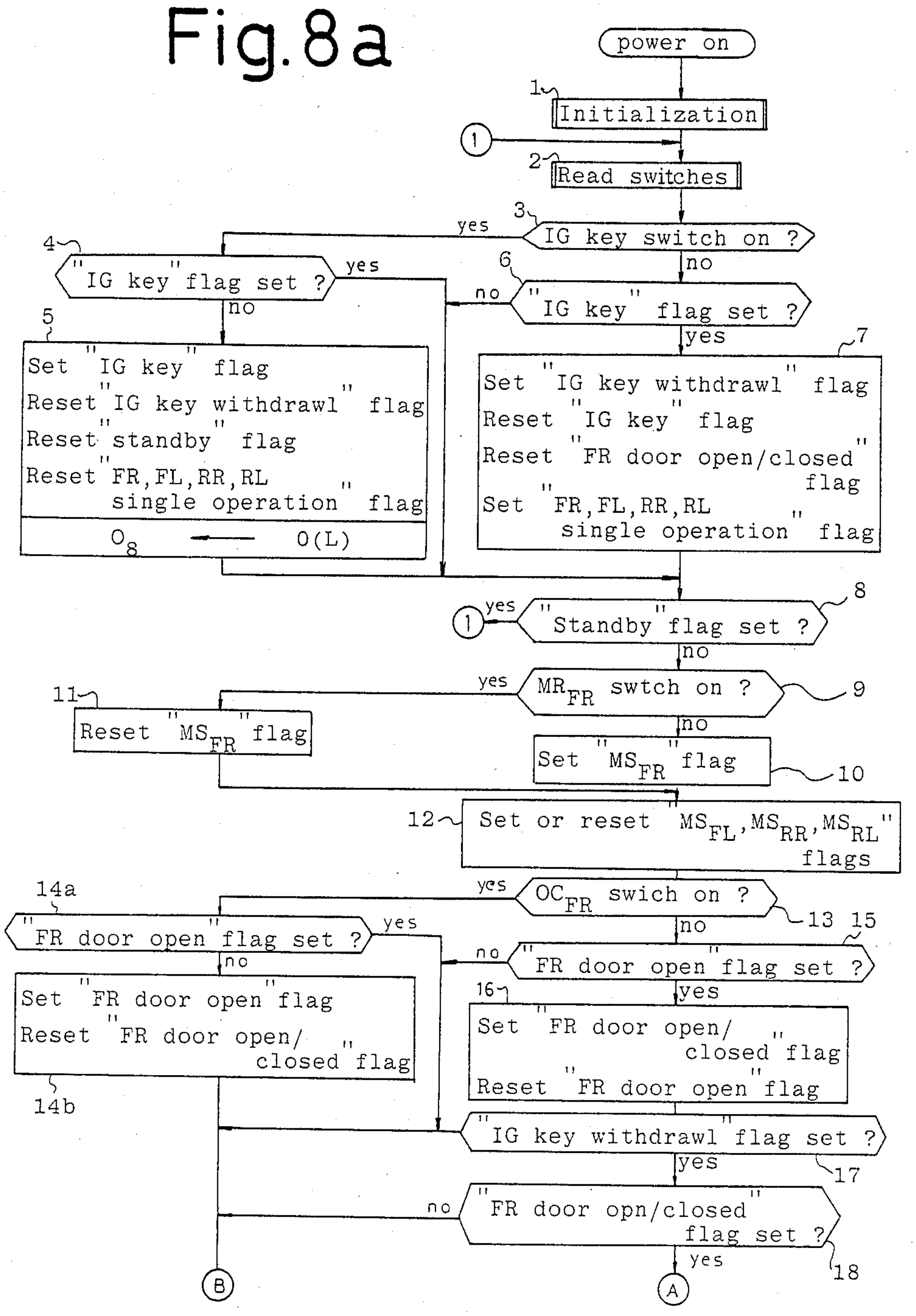
FIGS. 8*a,* 8*b,* 8*c,* 8*d,* 8*e,* 8*f,* 8*g,* 8*h,* 8*i,* 8*j,* 8*k,* 8*l,* 8*m* and 8*n* are flowcharts illustrating a control operation by the microcomputer shown in FIGS. 4*a* and 4*b;*
Figure 8B:
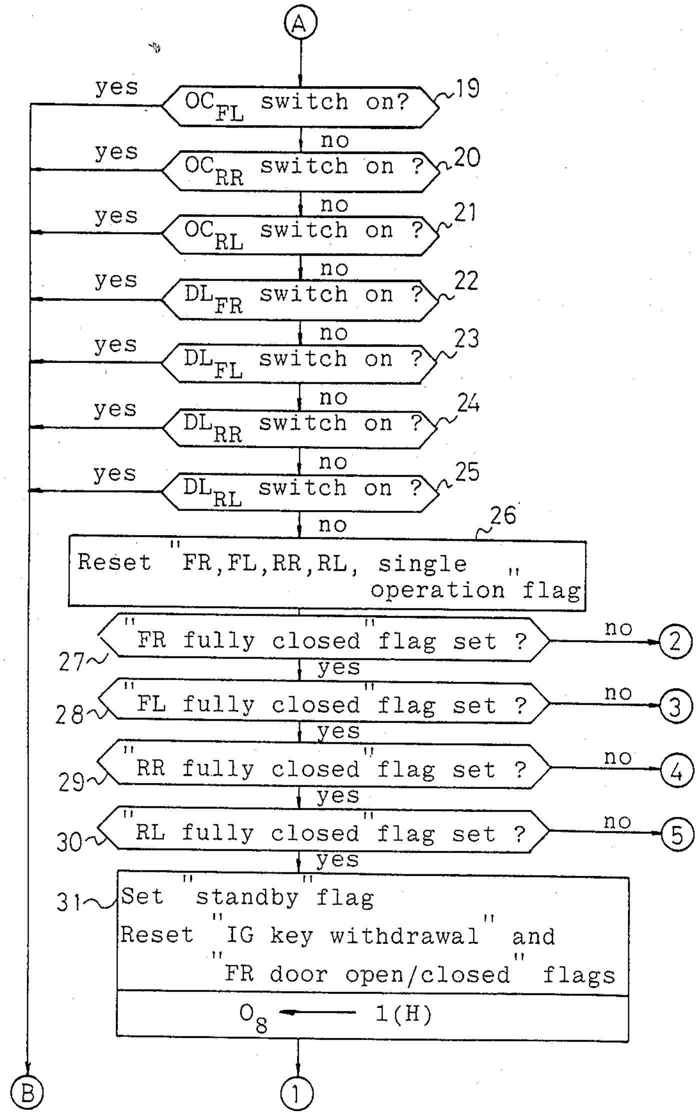
Figure 8C:
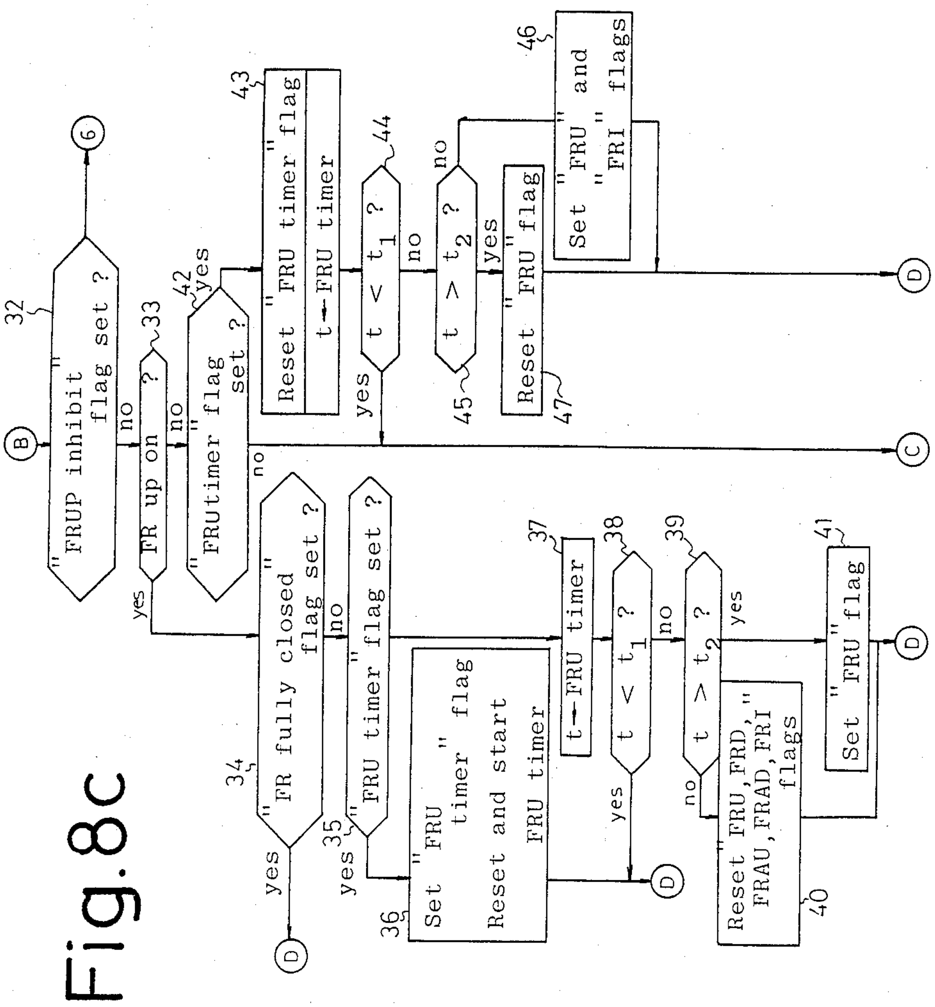
Figure 8D:
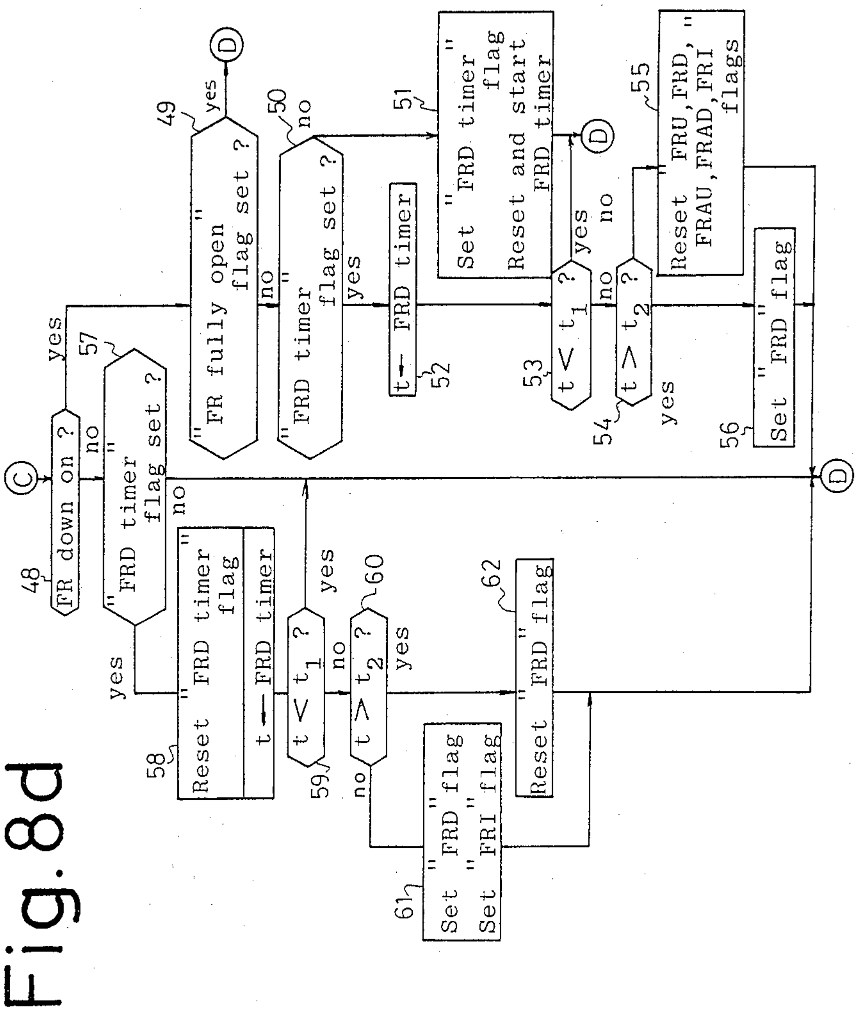
Figure 8E:
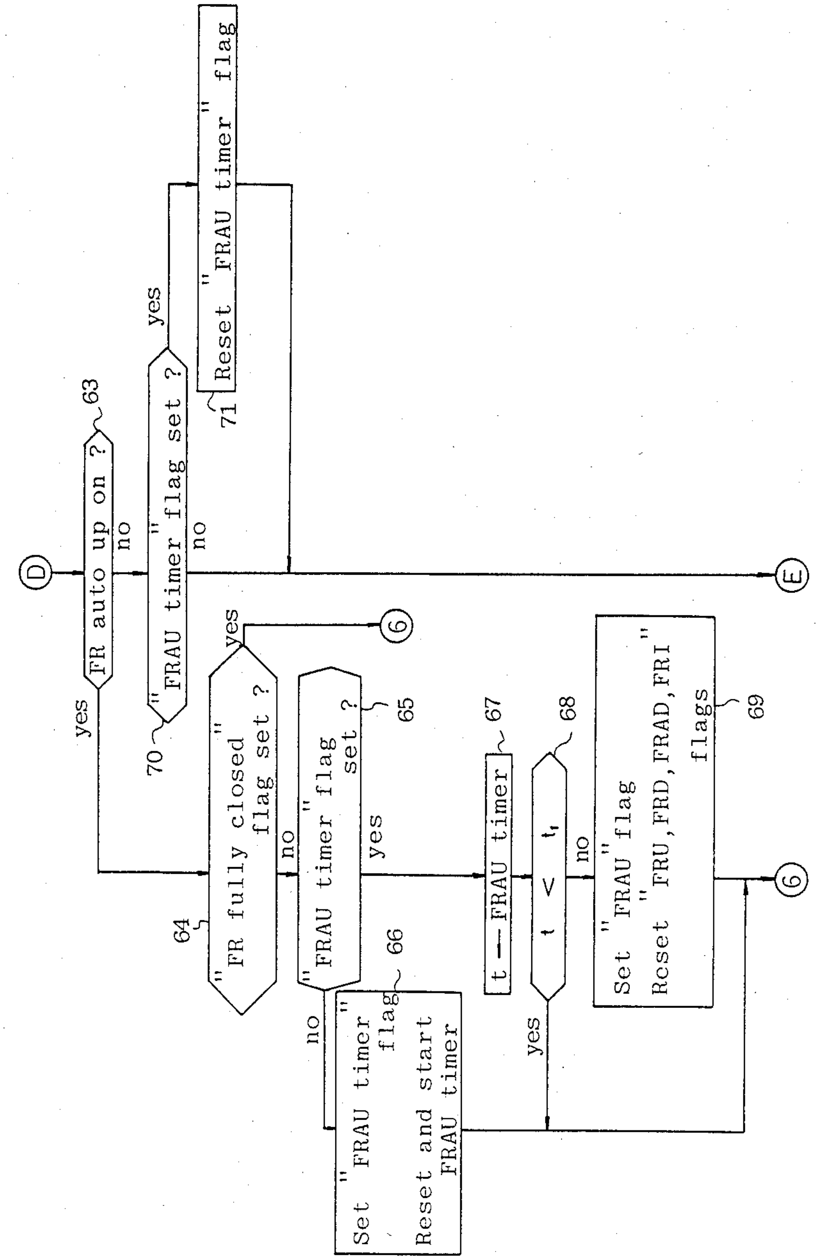
Figure 8F:
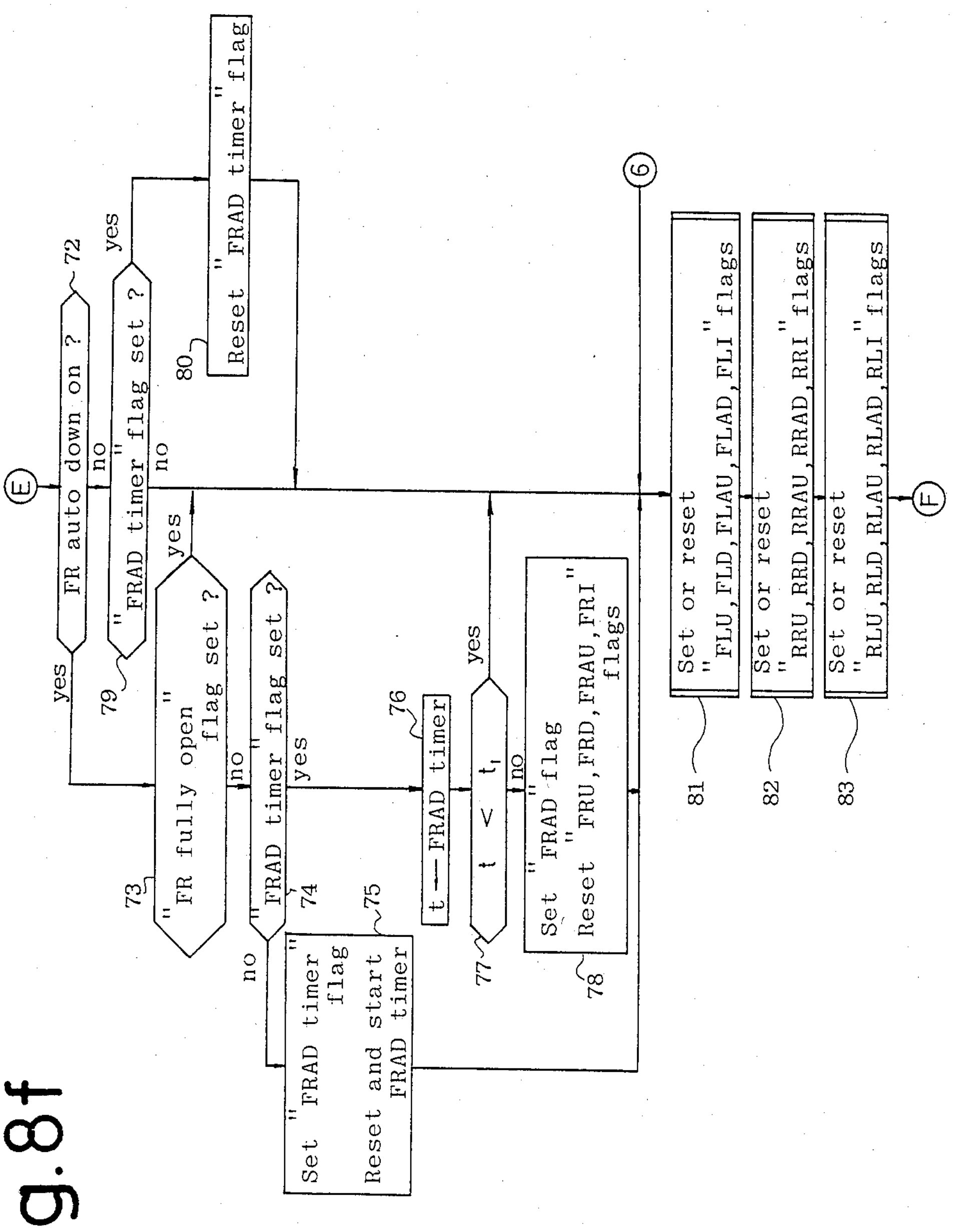
Figure 8G:
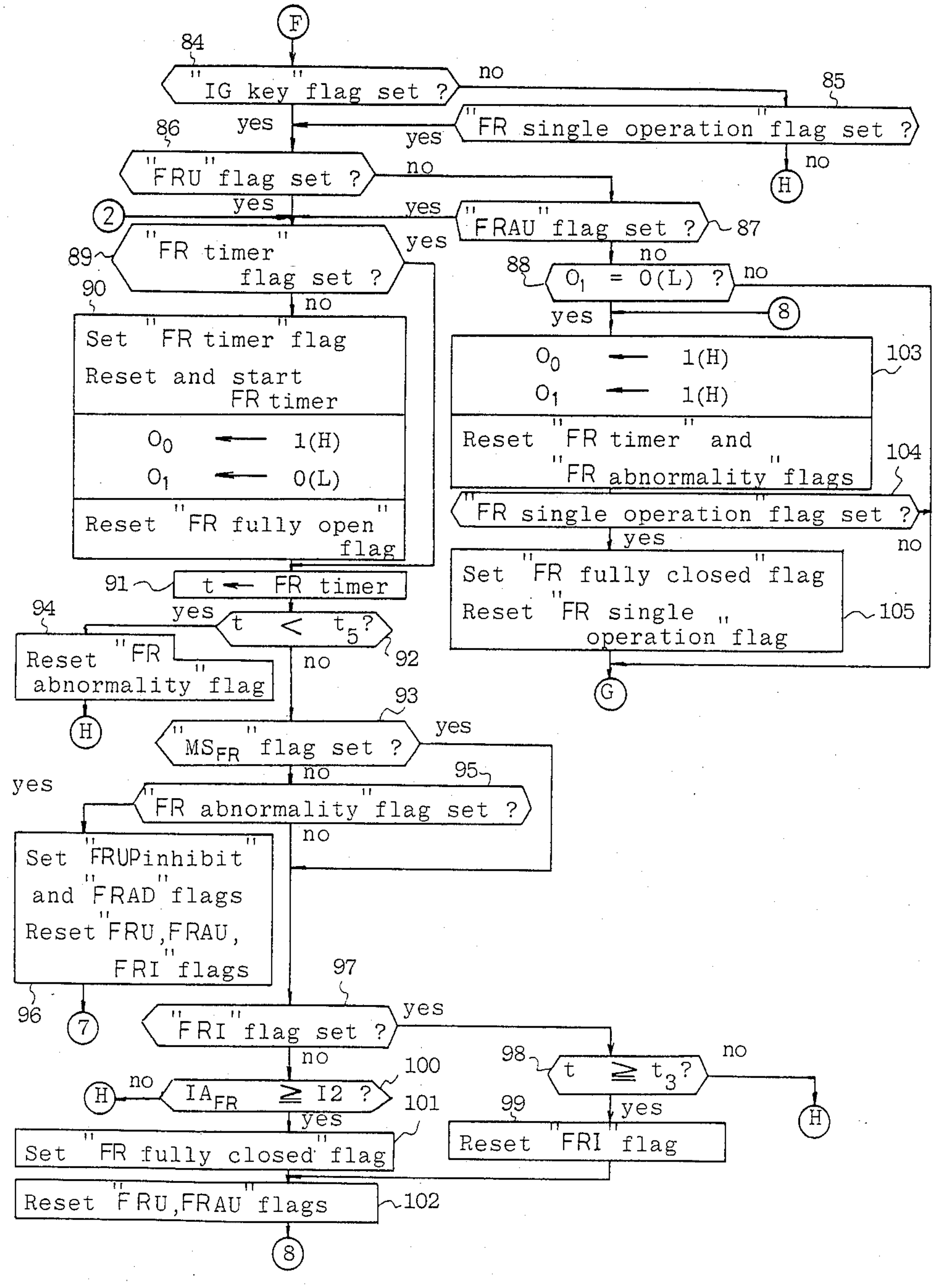
Figure 8H:
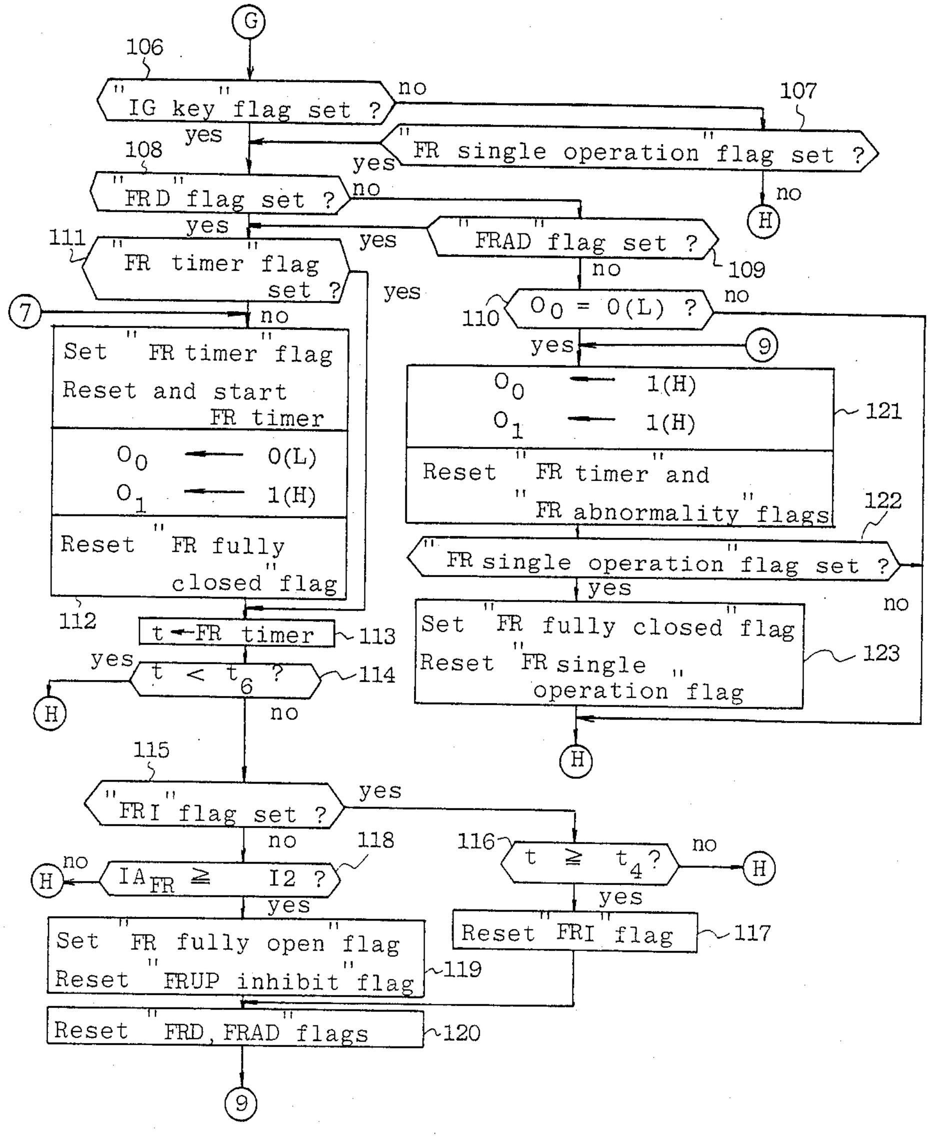
Figure 8I:
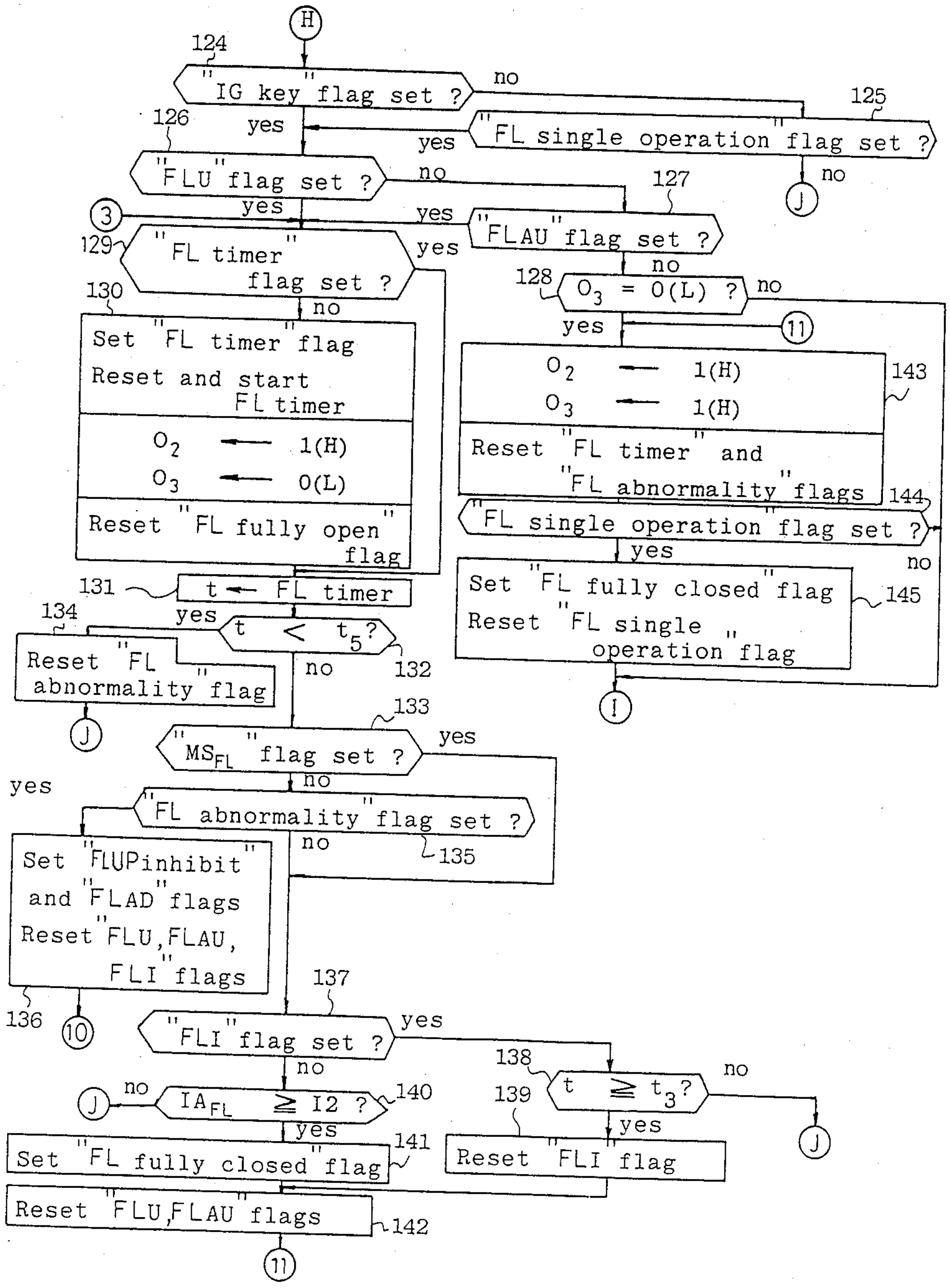
Figure 8J:
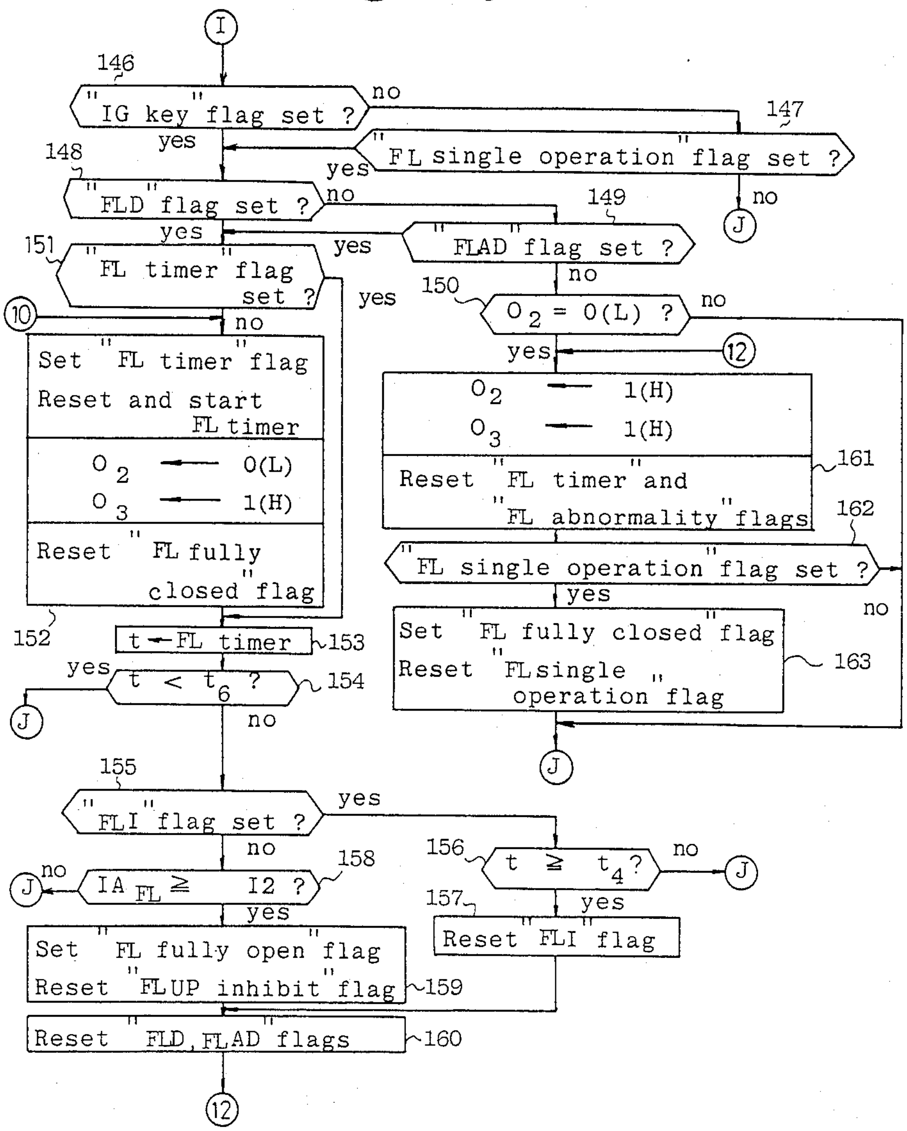
Figure 8K:
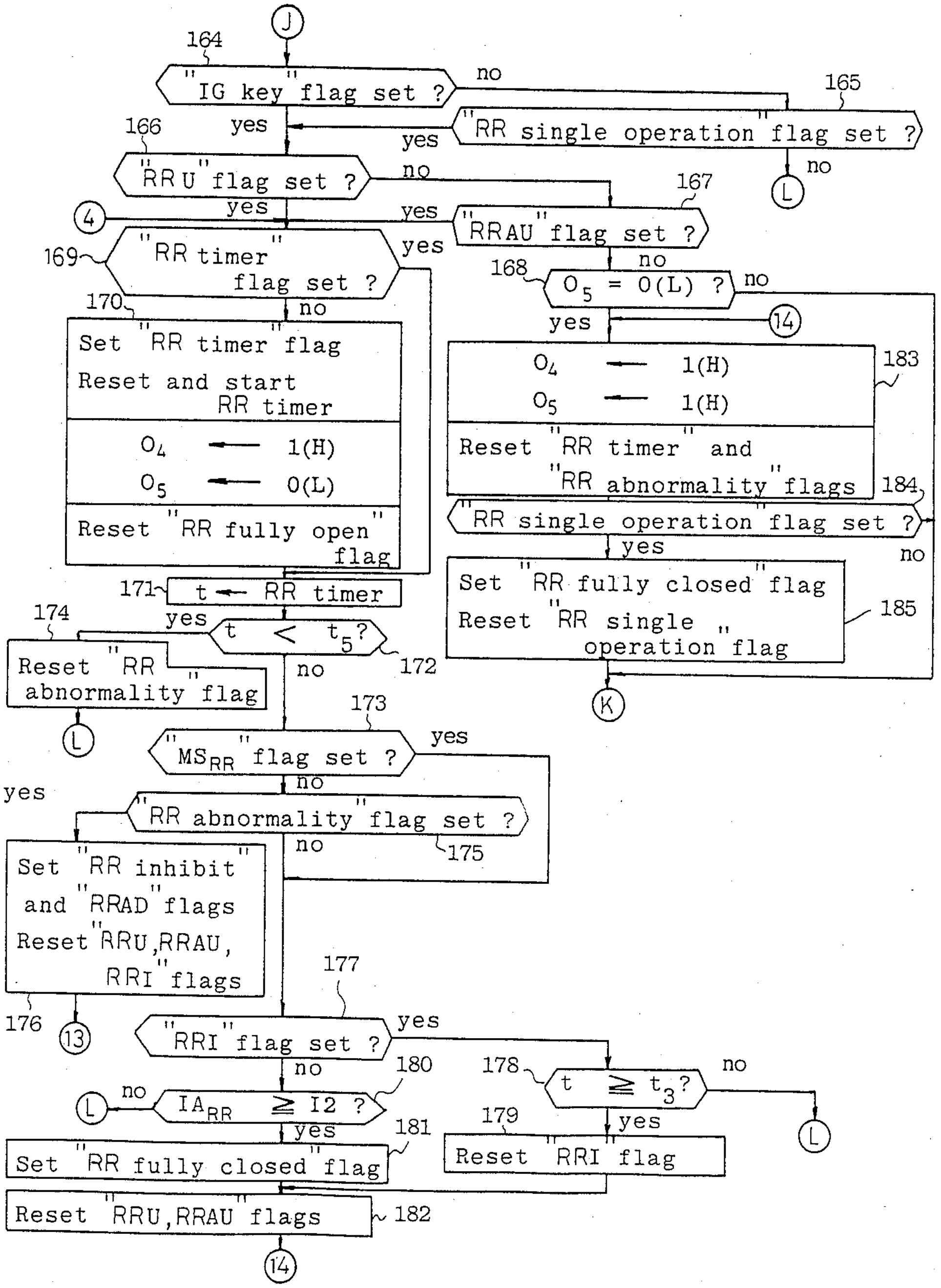
Figure 8I:
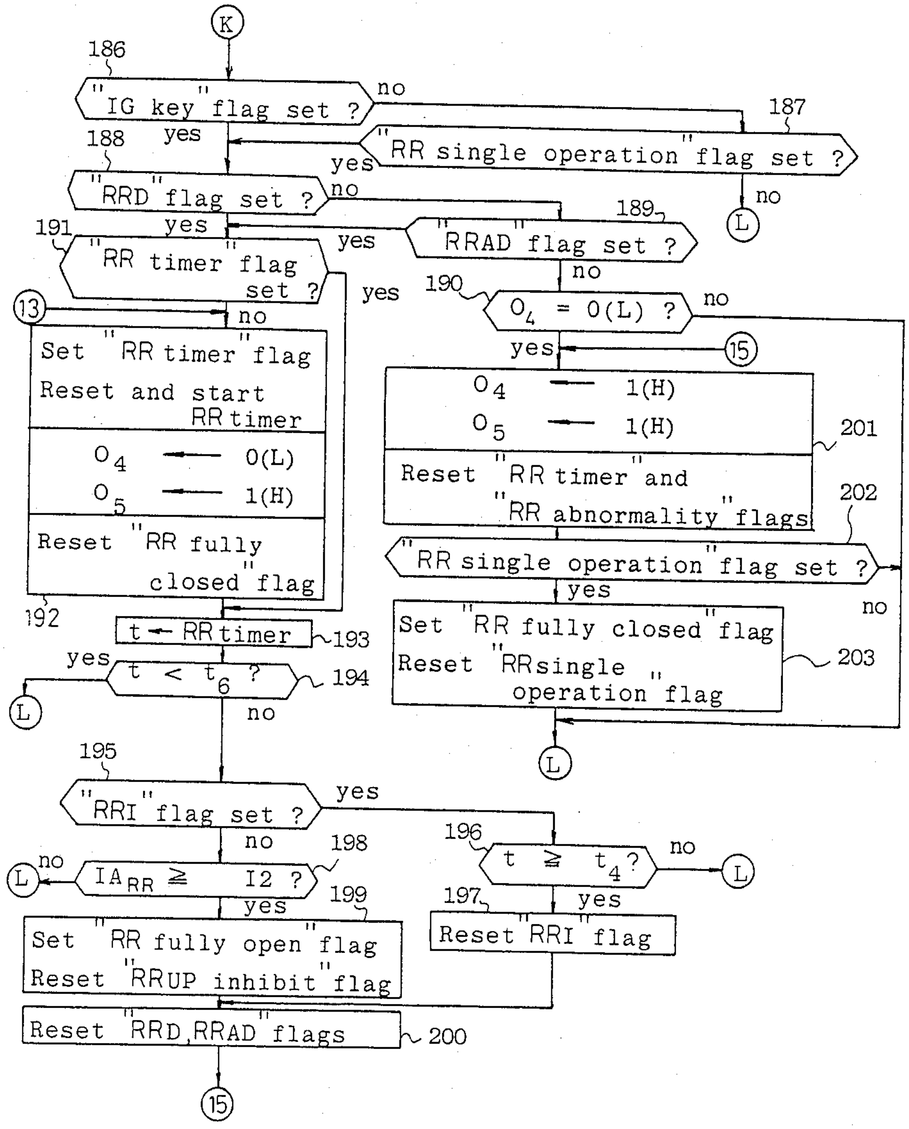
Figure 8M:
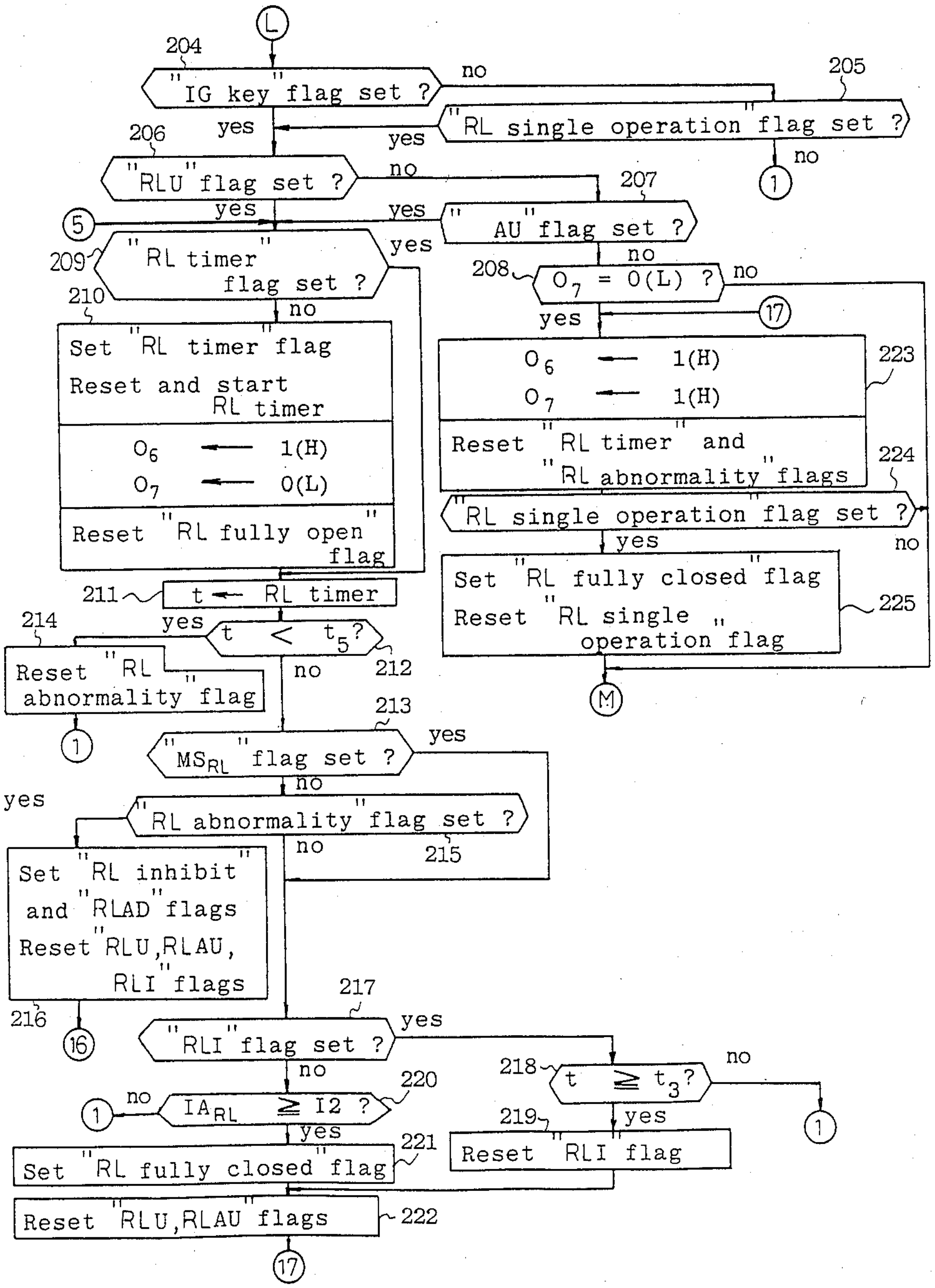
Figure 8N:
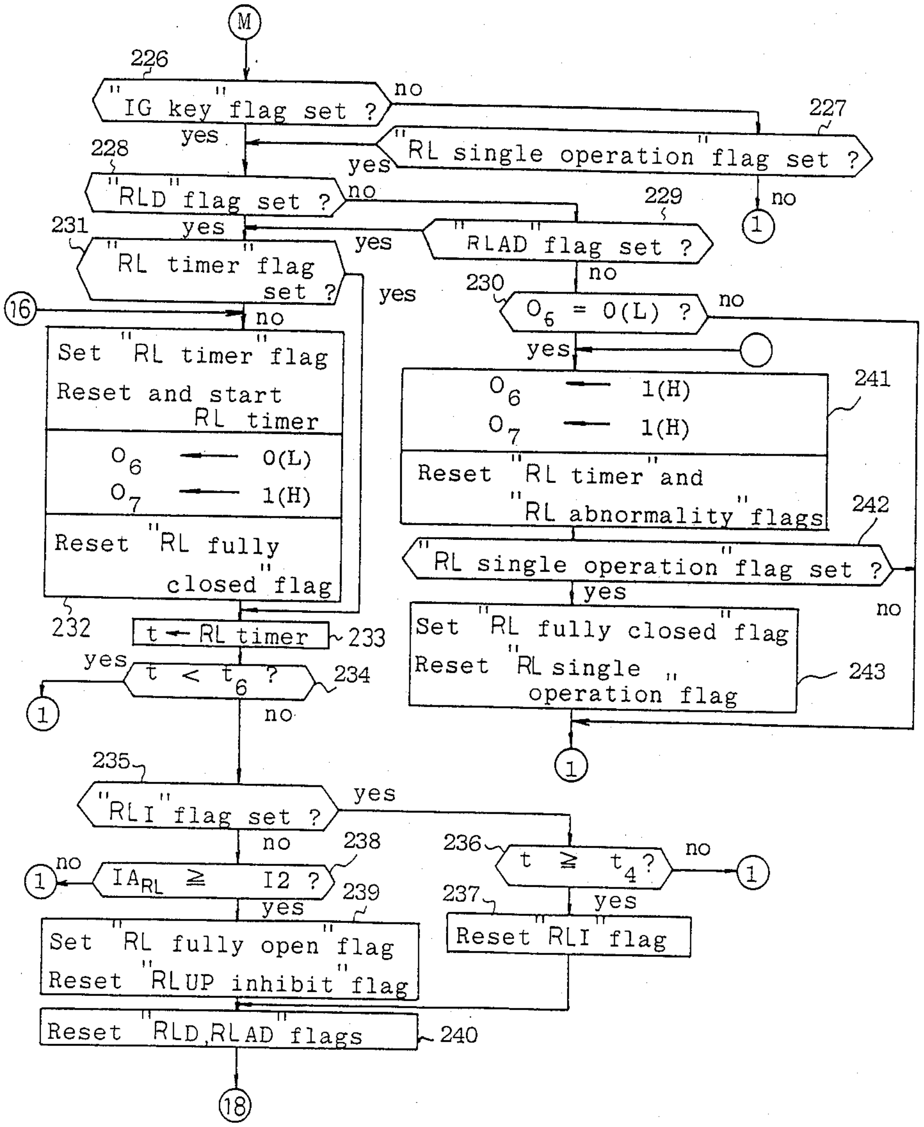
Figure 9:
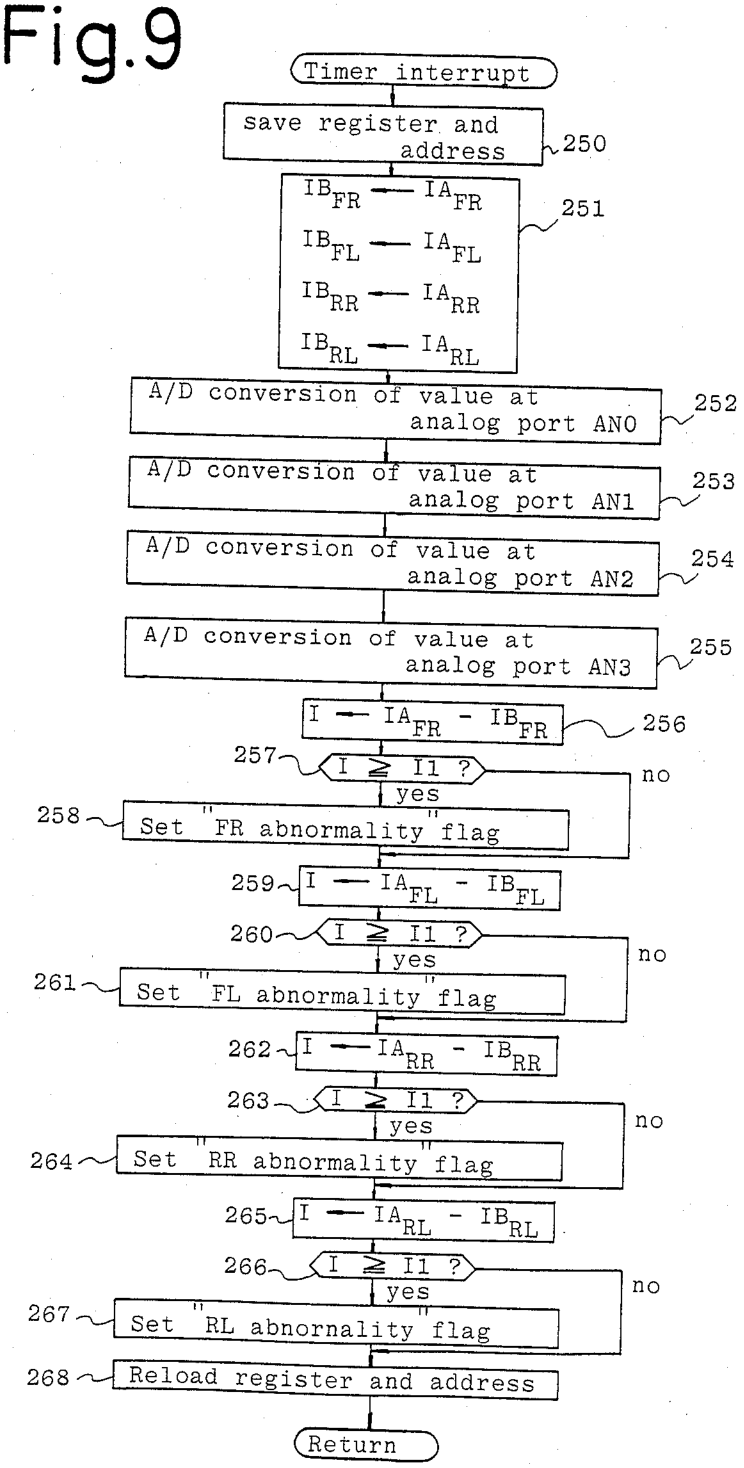
FIG. 9 is a flowchart of a timer interrupt operation by the microcomputer shown in FIGS. 4*a* and 4*b.

FIGS. 8*a* to 8*n* illustrate main routines for the control operation according to the paragraphs A to H which is executed by the microcomputer 7. FIG. 9 shows a flowchart for a timer interrupt routine which is used to detect any abnormality. The control operation by the microcomputer 7 will now be described in detail with reference to these Figures.

Initially, flags, timers and registers used in these flowcharts will be described. The timers will be described first.

FRU, FLU, RRU, RLU timers: These timers determine the length of time during which UP contact of FR window, FL window, RR window and RL window, respectively, remains on.

FRD, RLD, RRD, RLD timers: These timers determine the length of time during which DOWN contact of the FR window, FL window, RR window and RL window, respectively, remains on.

FRAU, FLAU, RRAU, RLAU timers: These timers determine the length of time during which AUTO UP contact of the FR window, FL window, RR window and RL window, respectively, remains on.

FRAD, FLAD, RRAD, RLAD timers: These timers determine the length of time during which AUTO DOWN contact of the FR window, FL window, RR window and RL window, respectively, remains on.

FR, FL, RR, RL timers: These timers determine the length of time during which the electric motor which elevates the FR window, FL window, RR window and RL window, respectively, is energized for rotation in either forward or reverse direction.

Interrupt timer: This timer develops an internal interrupt signal at a given time interval which is greater than the processing time required by the main routine.

The flags will now be described.

"IG key" flag: This flag indicates that the ignition key is inserted into the ignition key receptacle.

"IG key withdrawal" flag: This flag indicates that the ignition key is withdrawn from the receptacle, indicating a change from the inserted to the noninserted condition.

"FR single operation", "FL single operation", "RR single operation" and "RL single operation" flags: These flags indicate a single operation mode for the respective windows.

"FR door open" flag: This flag indicates that FR door has been opened.

"FR door open/closed" flag: This flag indicates that FR door has been closed after it was once opened.

"Standby" flag: This flag indicates that the standby mode is established.

"$MS_{FR}$", "$MS_{FL}$", "$MS_{RR}$", "$MS_{RL}$" flags: These flags indicate that the respective limit switches are off.

"FR fully closed", "FL fully closed", "RR fully closed", "RL fully closed" flags: These flags indicate that the FR window, FL window, RR window and RL window are either in their fully closed condition or in their standby position.

"FRU timer", "FLU timer", "RRU timer", "RLU timer" flags: These flags indicate that the respective timers have been started.

"FRD timer", "FLD timer", "RRD timer", "RLD timer" flags: These flags indicate that the respective timers have been started.

"FRAU timer", "FLAU timer", "RRAU timer", "RLAU timer" flags: These flags indicate that the respective timers have been started.

"FRAD timer", "FLAD timer", "RRAD timer", "RLAD timer" flags: These flags indicate that the respective timers have been started.

"FRU", "FLU", "RRU", "RLU" flags: These flags indicate the occurrence of a window closing control corresponding to the on condition of UP contact for the respective windows.

"FRD", "FLD", "RRD", "RLD" flags: These flags indicate the occurrence of a window opening control corresponding to the on condition of DOWN contact for the respective windows.

"FRAU", "FLAU", "RRAU", "RLAU" flags: These flags indicate the occurrence of a window closing control in which the individual windows are closed to their fully closed position.

"FRAD", "FLAD", "RRAD", "RLAD" flags: These flags indicate the occurrence of a window opening control in which each of the windows is opened to its fully open position.

"FRI", "FLI", "RRI", "RLI" flags: These flags indicate an inching operation or an opening/closing control in small increments of the respective windows.

"FR timer", "FL timer", "RR timer", "RL timer" flags: These flags indicate that the respective timers have been started.

"FR abnormality", "FL abnormality", "RR abnormality", "RL abnormality", flags: These flags indicate the occurrence of an abnormality when driving any of these windows.

"FRUP inhibit", "FLUP inhibit", "RRUP inhibit", "RLUP inhibit" flags: These flags indicate that an abnormality processing mode for the respective windows has been established.

Constants are described below.

Constant t1: This constant represents a time interval which serves as marginal value which prevents a malfunctioning as a result of a chattering of a window controlling switch (either up/down switch, or automatic up/down switch). A switch on condition which continues for a time interval less than t1 seconds is discarded as noises.

Constant t2: This constant represents a threshold which is used to determine an inching operation for a window controlling switch (either up/down switch or automatic up/down switch). A switch on condition which continues for a time interval less than t2 seconds is determined as a command for an inching operation.

Constant t3: This constant indicates the duration during which the motor is energized for rotation in the forward direction which is required by an inching operation or closing the window in small increments.

Constant t4: This constant indicates the duration during which the motor is energized for rotation in the reverse direction which is required for an inching operation or opening the window in small increments.

Constant t5: This constant indicates a rise time when the motor is energized for rotation in the forward direction.

Constant t6: This constant indicates a rise time when the motor is energized for rotation in the reverse direction.

Constant I1: This constant indicates an abnormal motor current value.

Constant I2: This constant represents a threshold which is used to determine a motor lock current.

Registers will now be described.

t register: A value in each timer is loaded into this register for comparison against one of the described constants t1 to t6.

$IA_{FR}$, $IA_{FL}$, $IA_{RR}$, $IA_{RL}$ registers: The present value of the current through the motors $M_{FR}$, $M_{FL}$, $M_{RR}$ and $M_{RL}$ is stored in these registers.

$IB_{FR}$, $IB_{FL}$, $IB_{RR}$, $IR_{RL}$ registers: The current value through the motors $M_{FR}$, $M_{FL}$, $M_{RR}$ and $M_{RL}$ during the immediately preceding timer interrupt operation are stored in these registers.

I register: This register is used to load a difference between $IA_{FR}$ register and $IB_{FR}$ register, a difference between $IA_{FL}$ register and $IB_{FL}$ register, a difference between $IA_{RR}$ register and $IB_{RR}$ register and a difference between $IA_{RL}$ register and $IB_{RL}$ register therein for comparison against the threshold I1.

The control operation mentioned under the paragraphs A to H will now be described in detail. In the description to follow, a notation "S . . . " represents a step number in the flowchart. When a storage battery mounted on the vehicle is connected to the supply line of the control system, output ports, registers and flags are initialized at S1, and an interrupt timer is started to enable an interrupt. All of output ports O0 to O8 are set to "1" (H level), thus deenergizing all the relays RY1 to RY9 and setting "standby" flag to establish a standby mode.

At S2, output ports P1 and P2 are updated in the sequence of (0, 0), (0, 1), (1, 0) and (1, 1), reading the switch status in the input switch circuit 8 while updating the stored content or flags of the internal RAM. In the standby mode, a loop which waits for an input from IG key switch is defined comprising S2, S3, S6, S8, S2 and so on, and other switch entries are not read. Accordingly, before the IG key switch is turned on, a user of the vehicle may operate according to the paragraphs A and B, unlocking the door, accompanying an on condition of the door lock/unlock switches ($DL_{FR}$, $DL_{FL}$, $DL_{RR}$, $DL_{RL}$), open the door, accompanied by an on condition of courtesy switches ($OC_{FR}$, $OC_{FL}$, $OC_{RR}$, $OC_{RL}$), close the door again, accompanied by the off condition of the courtesy switches, and then again lock the door, accompanied by the off condition of door lock/unlock switches. However, these operations are irrelevant to the control.

When the driver inserts the ignition key into the receptacle according to the procedure mentioned under the paragraph C, the IG key switch is turned on. Upon detection of this, the program proceeds to S2 to S3 to S4. Since "IG key" flag is not set initially, "IG key" flag is set at S5 and "standby" flag is reset to terminate the standby mode. During the standby mode, the relay RY9 is deenergized to activate the theft preventing circuit 12, and therefore this relay is now energized to cease to operate the theft preventing circuit 12.

When the vehicle is in use, the ignition key may be withdrawn and then re-inserted because of need to open or close a fuel lid or trunk lid. In this instance, "IG key withdrawal" flag, "FR single operation" flag, "FL single operation" flag, "RR single operation" flag and "RL single operation" flag are set, as will be described later. Thus, these flags are reset at S5 each time the ignition key is inserted. When the standby mode is terminated, the program can proceed to S9 and subsequent steps.

When reading the position detecting limit switch $MS_{FR}$ associated with the FR window, "$MS_{FR}$" flag is set if it is off (at S9 and S10), and "$MS_{FR}$" flag is reset (at S9 and S11) if it is on. Similarly, at S12, "$MS_{FL}$" flag is either set or reset in accordance with the status of the position detecting limit switch $MS_{FL}$ associated with the FL window, "$MS_{RR}$" flag is either set or reset in accordance with the status of the position detecting limit switch $MS_{RR}$ associated with the RR window, and "$MS_{RL}$" flag is either set or reset in accordance with the status of the position detecting limit switch $MS_{RL}$ associated with the RL window. If the FR door is either opened or closed during the time the vehicle is in use, associated flags are operated in a corresponding manner at S13 to S16, but the description will be continued assuming that the program proceeds from S13 to S15 to S32.

(1) A control over a window opening responsive to an operation mentioned under the subparagraph $D_1$ will be described. During a switch reading at S2, if the up/down switch associated with the FR window is detected to have been depressed or tilted at its down side, it is detected at S48 (FIG. 8*d*). (The operation which occurs when "FRUP inhibit" flag is set at S32 will be described later.) When it is found at S49 that "FR fully open" flag is set, this means that the FR window is fully open, and the glass pane cannot be lowered further downward. Accordingly, the program proceeds to S63 and subsequent steps. Otherwise, "FRD timer" flag is set and FRD timer is reset and then started (at S50 and S51) in response to the initial reading of the switch operation. Subsequently, the program goes through a loop for the normal window opening/closing control mode which comprises S63 and subsequent steps, and when it moves back to S50 again, since "FRD timer" flag is set now, the value of FRD timer is loaded into t register (at S52) for comparison against the constant t1 (at S53).

When the length of time during which DOWN contact of the FR window remains on is less than t1 seconds, it is possible that the closure of contact is caused by a chattering which results from oscillations of the vehicle, and accordingly the program waits for the time t1 to pass while remaining in this loop. Thereupon flags relating to the control of opening or closing the FR window, namely, "FRU" flag, "FRD" flag, "FRAU" flag, "FRAD" flag and "FRI" flag are reset at S55. This enables the control to be changed to one corresponding to a new switch operation for the FR window (the depression at the down side). Subsequently, when the up/down switch for the FR window is depressed at its down side and continues over a time which exceeds t2 seconds (S54), this represents that an operation according to the subparagraph $D_1$ has been performed. Accordingly, "FRD" flag which indicates an FR window opening control is set. In the present embodiment, the value of t2 is chosen to be 0.3 second.

At S81, "FLD" flag is set if it is found that the up/down switch for the FL window has been depressed or tilted at its down side; at S82, "RRD" flag is set if it is found that the up/down switch for the RR window has been depressed or tilted at its down side; and at S83, "RLD" flag is set if it is found that the up/down switch for the RL window has been depressed or tilted at its down side.

When "FRD" flag is set, it is detected at S108 (FIG. 8*h*: "IG key" flag being set), and "FR timer" flag is set in response to the initial detection, establishing 0 (L level) and 1 (H level) at output ports O0 and O1, respectively (at step S111, S112). This energizes the relay RY1 and deenergizes the relay RY2 shown in FIGS. 4*a* and 4*b*, whereby a current as indicated by an arrow DOWN flows through the electric motor $M_{FR}$ which is used for elevating the window of the FR door, thus energizing it for rotation in the reverse direction. The time duration during which the motor $M_{FR}$ is energized is determined by resetting and starting the FR timer. Since the FR window is lowered in response to the rotation of the motor $M_{FR}$ in the reverse direction, "FR fully closed" flag is reset.

At S113, the value of the FR timer is loaded into the register t for comparison against the constant t6 at S114. If the value of the timer is less than t6, this represents the fact that it is now during the rise time of the motor $M_{FR}$ in the reverse direction, and the program proceeds to S124 and subsequent steps. After going through the control loop and returning to S114 again and when it is found that the motor $M_{FR}$ has been energized for a length of time which exceeds t6 seconds, the magnitude of the motor current is examined. In a timer interrupt routine shown in FIG. 9 and to be described later, which is executed in response to each timer interrupt, the motor current is stored in $IA_{FR}$ register by reading the motor current from the analog port AN0 and an accompanied A/D conversion (S252). The value in $IA_{FR}$ register is compared against the motor lock current value I2 (S118) and if the motor current is equal to or less than I2, the program proceeds to S124 and subsequent steps.

If "FLD" flag is set at S81, it is detected at S148 (FIG. 8*j*), and in a similar manner as mentioned previously, 0 (L level) and 1 (H level) are established at output ports O2 and O3, respectively, at S152, thus energizing the relay RY3 and deenergizing the relay RY4 shown in FIGS. 4*a* and 4*b* to energize the electric motor $M_{FL}$ for rotation in the reverse direction. After the rise time of the motor $M_{FL}$ has passed (S154), the motor current is monitored (S158).

If "RRD" flag is set at S82, it is detected at S118 (FIG. 8*l*), and 0 (L level) and 1 (H level) are established at output ports O4 and O5, respectively, at S192, thus energizing the relay RY5 and deenergizing the relay RY6 shown in FIGS. 4*a* and 4*b* to energize the electric motor $M_{RR}$ for rotation in the reverse direction. Subsequently, when the rise time of the motor $M_{RR}$ in its rotation in the reverse direction has passed (S194), the motor current is monitored (S198).

If "RLD" flag is set at S83, it is detected at S228 (FIG. 8*n*), and 0 (L level) and 1 (H level) are established at output ports O6 and O7, respectively, at S232 in the similar manner as before, thus energizing the relay RY7 and deenergizing the relay RY8 shown in FIGS. 4*a* and 4*b* to energize the electric motor $M_{RL}$ for rotation in the reverse direction. After the rise time for the motor $M_{RL}$ in its rotation in the reverse direction has passed (S234), the motor current is monitored (S238).

Since the operation according to the subparagraph $D_1$ is now being considered, when it is determined from a switch reading at S2 that the up/down switch for the FR window is not depressed or tilted at its down side, the program proceeds to S48 to S57, and to S58, resetting "FRD timer" flag and loading the value in the FRD timer into the register t for comparison against the constants t1 and t2 (S59, S60). Since "FRD" flag is already set, the time duration during which DOWN contact of the FR window remains on exceeds t2 seconds (see the subparagraph $D_1$), and accordingly "FRD" flag is reset at S62.

At S81, "FLD" flag is reset in response to the absence of the depression (or tilting) of the up/down switch of the FL window at its down side if "FLD" flag has been set. At S82, "RRD" flag is reset in response to the absence of the depression (or tilting) of the up/down switch of the RR window at its down side if "RRD" flag has been set. At S83, "RLD" flag is reset in response to the absence of the depression (or tilting) of the up/down switch of the RL window at its down side if "RLD" flag has been set.

When "FRD" flag is reset, the program proceeds through S108 to S109 to S110 in FIG. 8*h*. At this time, since 0 (L level) is established at the output port O0 to energize the electric motor $M_{FR}$ for rotation in the reverse direction, 1 (H level) is established at both output ports O0 and O1 to deenergize both relays RY1 and RY2 shown in FIGS. 4*a* and 4*b*, thus causing the motor $M_{FR}$ to assume the ground potential at its opposite ends to cease its rotation. The FR window comes to a stop at this location. "FR timer" flag and "FR abnormality" flag are now reset, and the program proceeds to S124 and subsequent steps since "FR single operation" flag is not set.

If "FLD" flag is reset after setting "FLD" flag at S81, 0 (L level) is established at the output port O2 to energize the electric motor $M_{FL}$ for rotation in the reverse direction, so that 1 (H level) is established at both output ports O2 and O3 at S161 (FIG. 8*j*), thus deenergizing the relays RY3 and RY4. This ceases the rotation of the motor $M_{FL}$, and the FL window comes to a stop at this location. "FL timer" flag and "FL abnormality" flag are now reset, and the program proceeds to S164 and subsequent steps since "FL single operation" flag is not set.

If "RRD" flag is reset after it has been set at S82, 0 (L level) is established at the output port O4 to energize the electric motor $M_{RR}$ for elevating the window associated with the RR window for rotation in the reverse direction. Accordingly, 1 (H level) is established at both output ports O4 and O5 at S201 (FIG. 8*l*), deenergizing the relays RY5 and RY6. This ceases the rotation of the motor $M_{RR}$, and the RR window comes to a stop at this location. "RR timer" flag and "RR abnormality" flag are now reset, and the program proceeds to S204 and subsequent steps since "RR single operation" flag is not set.

If "RLD" flag is reset after it has been set at S83, 0 (L level) is established at the output port O6 to energize the electric motor $M_{RL}$ for rotation in the reverse direction. Accordingly, 1 (H level) is established at both output ports O6 and O7 at S241 (FIG. 8*n*), deenergizing the relays RY7 and RY8. This ceases the rotation of the motor $M_{RL}$, and the RL window comes to a stop at this location. "RL timer" flag and "RL abnormality" flag are now reset, and the program proceeds to S2 and subsequent steps since "RL single operation" flag is not set.

The above describes a window opening control in response to an operation of the subparagraph $D_1$. The continued depression or tilting of the down switch which causes the window to be fully open and the motor lock current to be detected will be treated in the description of a control which is responsive to an operation according to the subparagraph $D_3$ (automatic down operation).

(2) A window opening control responsive to an operation according to the subparagraph $D_1'$ will now be described. It is to be understood that the processing operation up to the point where "FRU" flag, "FRAU" flag, "FRD" flag, "FRAD" flag and "FRI" flag are reset at S55 by detecting the on condition of the up/-down switch for the FR window at its down side which continues over a time length exceeding t1 seconds is identical to the processing operation described under the paragraph (1), and therefore will not be repeated.

When the depression or tilting of the up/down switch for the FR window at its down side is released before a timer which counts the timer duration of such switch being depressed at its down side exceeds the time interval t2 (S57 to S60), this means that the operation according to the subparagraph $D_1'$ has been performed. Accordingly, "FRD" flag which indicates the occurrence of the FR window opening control and "FRI" flag representing an incremental time window opening control or an inching operation are set.

At S81, "FLD" flag and "FLI" flag are both set in response to the depression or tilting of the up/down switch for the FL window at its down side which continues over t1 seconds but less than t2 seconds. At S82, "RRD" flag and "RRI" flag are set in response to the depression or tilting of the up/down switch for the RR window at its down side which continues over a time period greater than t1 seconds and less than t2 seconds. At S83, "RLD" flag and "RLI" flag are set in response to the depression or tilting of the up/down switch for the RL window at its down side which continues over a time period greater than t1 seconds and less than t2 seconds.

The processing operation in which "FRD" flag is detected at S108 and 0 (L level) and 1 (H level) are established at the output ports O0 and O1, respectively, to energize the motor $M_{FR}$ for rotation in the reverse direction, followed by waiting for the rise time (t6 seconds) of the motor to pass remains the same as the corresponding processing operation mentioned under the paragraph (1), and therefore, will not be described again. When the rise time, t6 seconds, of the motor $M_{FR}$ has passed, "FRI" flag is detected at S115.

At S116, the value in the register t is compared against the duration t4 for the energization of the motor for rotation in the reverse direction which is required to perform an incremental window opening, and if the value in the register t is less than t4 seconds, the program loops around the control loop. In the present embodiment, the value of t4 is chosen as a time interval which is required to open the glass pane by 10 mm. When the duration of energization of the motor $M_{FR}$ in the reverse direction exceeds t4 seconds, "FRI" flag is reset at S117 and "FRD" flag is reset at S120 ("FRAD" flag being reset), the program then proceeding to S121. At S121, 1 (H level) is established at both output ports O0 and O1, deenergizing the relays RY1 and RY2. This causes the motor $M_{FR}$ to assume the ground potential at its opposite terminals, and hence the motor ceases to rotate. The FR window comes to a stop after being opened through an incremental distance (10 mm). "FR timer" flag and "FR abnormality" flag are now reset, and the program proceeds to S124 and subsequent steps since "FR single operation" flag is not set.

When "FLD" flag and "FLI" flag are set at S81, 0 (L level) and 1 (H level) are established at the output ports O2 and O3, respectively, at S152 shown in Fgi. 8*j*, energizing the electric motor $M_{FL}$ for rotation in the reverse direction. When the given time interval t4 seconds passes, 1 (H level) is established at the both output ports O2 and O3, thus deenergizing the motor $M_{FL}$ (S161). Subsequently, given flags are reset, and the program proceeds to S164 and subsequent steps since "FL single operation" flag is not set.

When "RRD" flag and "RRI" flag are set at S82, 0 (L level) and 1 (H level) are established at the output ports O4 and O5, respectively, at S192 shown in FIG. 8*l*, in the similar manner as mentioned above, thus energizing the electric motor $M_{RR}$ for rotation in the reverse direction. Subsequently, when the given time interval t4 seconds has passed, 1 (H level) is established at the both output ports O4 and O5, thus deenergizing the motor (S201). After resetting given flags, the program proceeds to S204 and subsequent steps since "RR single operation" flag is not set.

In a similar manner, when "RLD" flag and "RLI" flag are set at S83, 0 (L level) and 1 (H level) are established at the output ports O6 and O7, respectively, at S232 shown in FIG. 8*n*, thus energizing the electric motor $M_{RL}$ for rotation in the reverse direction. Subsequently, when the given time interval t4 seconds has passed, 1 (H level) is established at the both output ports O6 and O7, thus deenergizing the motor (S241). After resetting given flags, the program returns to S2 and subsequent steps since "RL single operation" flag is not set.

The above covers the window opening control responsive to an operation according to the subparagraph $D_1'$.

(3) A control responsive to an operation according to the subparagraph $D_3$ will now be described. If the depression of the automatic up/down switch for the FR window at its automatic down side is read during a switch reading at S2, and is detected at S72, the detection at S73 that "FR fully open" flag is set causes the program to proceed to S81 and subsequent steps since this means that the FR window is fully open and the glass pane cannot be further lowered. Otherwise, "FRAD timer" flag is set in response to the detection of the initial switch operation, and FRAD timer is reset and started (S74 and S75). Subsequently, the program loops around the normal window opening/closing control mode which comprises S81 and subsequent steps. When the program reaches S74 again, the value in the FRAD timer is loaded into register t (S76) for comparison against the constant t1 (S77) since "FRAD timer" flag is now set.

As mentioned before, if AUTO DOWN contact of the FR window remains on for a time interval which is less than t1 seconds, it is possible that this may be a result of chattering of the contact due to oscillations of the vehicle. Accordingly, the program remains in the loop while waiting for the time interval to exceed t1 seconds, whereupon "FRAD" flag is set while resetting "FRU" flag, "FRD" flag, "FRAU" flag and "FRI" flag. This establishes the control which is responsive to the depression of the automatic down side. When the depression at the automatic down side ceases, "FRAD timer" flag which is set is reset at S80.

At S81, "FLAD" flag is set in response to the depression of the automatic up/down switch of the FL window at its automatic down side, in the similar manner as mentioned previously. At S82, "RRAD" flag is set in response to the depression of the automatic up/down switch of the RR window at its automatic down side. At S83, "RLAD" flag is set in response to the depression of the automatic up/down switch of the RL window at its automatic down side.

The processing operation up to the point where the program proceeds to S108 to S109 to detect that "FRAD" flag is set and 0 (L level) and 1 (H level) are established at the output ports O0 and O1, respectively, to energize the motor $M_{FR}$ for rotation in the reverse direction, followed by waiting for the rise time (t6 seconds) to pass, remains the same as the processing operation mentioned above in connection with the paragraph (1), and therefore will not be described again. When the rise time (t6 seconds) for the rotation of the motor $M_{FR}$ in the reverse direction passes, the motor current is examined at S118. In the timer interrupt routine to be described later (see FIG. 9), the motor current is stored in register $IA_{FR}$ by reading it from the analog port AN0 (FIGS. 4*a* and 4*b*) followed by the A/D convertion (S252), and accordingly, the value in the $IA_{FR}$ register is compared against the motor lock current I2. If the motor current is equal to or less than I2, the program proceeds to S124 and subsequent steps. When the FR window has been lowered to its fully open position and the motor $M_{FR}$ has locked and the motor current exceeds I2 as a result of a repeated looping operation, the full opening of the FR window is detected to set "FR fully open" flag at S119. ("FRUP inhibit" flag will be described later.) "FRAD" flag is reset at S120 ("FRD" flag being reset). Subsequently, the program proceeds to S121 where 1 (H level) is established at the both output ports O0 and O1 to deenergize the relays RY1 and RY2 to cease the rotation of the motor $M_{FR}$. "FR timer" flag and "FR abnormality" flag are now reset, and the program then proceeds to S124 and subsequent steps since it is determined at the following step S122 that "FR single operation" flag is not set.

If "FLAD" flag is set at S81, it is detected at S149 (FIG. 8*j*), and in the similar manner as mentioned above, 0 (L level) and 1 (H level) are established at the output ports O2 and O3, respectively, thereby energizing the relay RY3 and deenergizing the relay RY4 to energize the electric motor $M_{FL}$ for rotation in the reverse direction. Subsequently, when the rise time for the motor $M_{FL}$ for its rotation in the reverse direction has passed (S154), the motor current is monitored (S158), and when the lock current is detected, "FL fully open" flag is set (S159) and "FLAD" flag is reset (S160, "FLD" flag is being reset). The program then proceeds to S161 where 1 (H level) is established at the output ports O2 and O3 to deenergize the relays RY3 and RY4 to cease the rotation of the motor $M_{FL}$. "FL timer" flag and "FL abnormality" flag are now reset, and the program proceeds to S164 and subsequent steps since it is determined at the following step S162 that "FL single operation" flag is not set.

If "RRAD" flag is set at S82, it is detected at S189 (FIG. 8*l*), and 0 (L level) and 1 (H level) are established at the output ports O4 and O5, respectively, at S192 to energize the relay RY5 and deenergize the relay RY6, thus energizing the electric motor $M_{RR}$ for rotation in the reverse direction. Subsequently, when the rise time for the motor $M_{RR}$ for its rotation in the reverse direction has passed (S194), the motor current is monitored (S198), and when the lock current is detected, "RR fully open" flag is set (S199) while "RRAD" flag is reset (S200; "RRD" flag being reset), the program thereafter proceeding to S201. Then 1 (H level) is established at the both output ports O4 and O5 to deenergize the relays RY5 and RY6, ceasing the rotation of the motor $M_{RR}$. "RR timer" flag and "RR abnormality" flag are now reset, and the program then proceeds to S204 and subsequent steps since it is determined at the following step S202 that "RR single operation" flag is not set.

If "RLAD" flag is set at S83, it is detected at S229 (FIG. 8*n*), and in the similar manner as before, 0 (L level) and 1 (H level) are established at the output ports O6 and O7, respectively, at S232, thereby energizing the relay RY7 and deenergizing the relay RY8 to energize the electric motor $M_{RL}$ for rotation in the reverse direction. Subsequently, when the rise time for the motor $M_{RL}$ for its rotation in the reverse direction has passed (S234), the motor current is monitored (S238), and when the lock current is detected, "RL fully open" flag is set (S239) while "RLAD" flag is reset (S240; "RLD" flag being reset), the program thereafter proceeding to S241 where 1 (H level) is established at both output pots O6 and O7 to deenergize the relays RY7 and RY8 to cease the rotation of the motor $M_{RL}$. "RL timer" flag and "RL abnormality" flag are now reset, and the program then returns to S2 and subsequent steps since it is determined at the following step S242 that "RL single operation" flag is not set. The above covers the window opening control responsive to an operation according to the subparagraph $D_3$ (automatic down).

(4) A control responsive to an operation according to the subparagraph $D_2$ will now be described. During a switch reading at S2, the depression or tilting of the up/down switch for the FR window at its up side is read, and is detected at S33 (the situation in which "FRUP inhibit" flag is set at S32 will be described later). If it is found at S34 that "FR fully closed" flag is set, this means that the FR window is fully closed and hence the glass pane cannot be further raised. Accordingly, the program proceeds to S63 and subsequent steps. Otherwise, in response to the detection of the initial switch operation, "FRU timer" flag is set and FRU timer is reset and started (S35 and S36). Subsequently, the program once goes through the loop for the normal window opening/closing control mode, which begins with S36, and when it comes back to S35 again, the value in the FRU timer is loaded into the register t (S37) for comparison with the constant t1 (S38), since "FRU timer" flag is now set.

As mentioned previously, when the time duration during which UP contact of the FR window remains on is less than t1 seconds, it is possible that the on condition is a result of a chattering of the contact due to oscillations of the vehicle. Accordingly, the loop waits for the time to exceed t1 seconds in this loop, whereupon the flags relating to the opening/closing control of the FR window, namely, "FRU" flag, "FRD" flag, "FRAU" flag, "FRAD" flag and "FRI" flag are reset at S40. This enables the control to be switched on which corresponds to a new switch operation for the FR window (the depression of the up side). If the up/down switch for the FR window continues to be depressed at its up side for a time interval which exceeds t2 seconds (S39), this means that the operation according to the subparagraph $D_2$ has been performed. Accordingly, "FRU" flag is set which indicates the FR window closing control.

If it is found at S81 that the up/down switch for the FL window has been depressed or tilted at its up side, "FLU" flag is set. At S82, "RRU" flag is set in response to the depression or tilting of the up/down switch for the RR window at its up side. Similarly, at S83, "RLU" flag is set in response to the depression or tilting of the up/down switch for the RL window at its up side.

When "FRU" flag is set, it is detected at S86 (FIG. 8*g*; "IG key" flag being set), and "FR timer" flag is set in response to the initial detection, establishing 1 (H level) and 0 (L level) at the output ports O0 and O1, respectively, (S89, S90). This energizes the relay RY2 and deenergizes the relay RY1, whereby a current indicated by an arrow UP flows through the electric motor $M_{FR}$ for elevating the window associated with the FR door, thus energizing the motor for rotation in the forward direction. The length of time during which the motor $M_{FR}$ is energized for rotation in the forward direction is determined by FR timer which is reset and then started. Since the FR window is raised in response to the rotation of the motor $M_{FR}$ in the forward direction, "FR fully open" flag is reset.

Referring to FIG. 9, the timer interrupt routine will be described. This routine is executed in response to a timer interrupt from an internal interrupt timer which occurs at a given time interval greater than the length of time required for the loop processing operation in the normal window opening/closing control mode indicated in FIGS. 8*a* to 8*n*. In response to the occurrence of an interrupt, the content of the registers and addresses are saved (S250), and the values in the registers $IA_{FR}$, $IA_{FL}$, $IA_{RR}$ and $IA_{RL}$ are loaded into the registers $IB_{FR}$, $IB_{FL}$, $IB_{RR}$ and $IB_{RL}$, respectively, at S251. At S252, the value obtained from the analog port AN0 (see FIGS. 4*a* and 4*b*) is read and subject to A/D conversion for storage in the register $IA_{FR}$. At S253, the value obtained from the analog port AN1 is read and subject to A/D conversion for storage in the register $IA_{FL}$. At S254, the value obtained from the analog port AN2 is read and subject to A/D conversion for storage in the register $IA_{RR}$. At S255, the value obtained from the analog port AN3 is read and subject to A/D conversion for storage in the register $IA_{RL}$. At this time, the registers $IA_{FR}$, $IA_{FL}$, $IA_{RR}$ and $IA_{RL}$ store the present current values of the electric motors $M_{FR}$, $M_{FL}$, $M_{RR}$ and $M_{RL}$, respectively, while the registers $IB_{FR}$, $IB_{FL}$, $IB_{RR}$ and $IB_{FL}$ stores the current values of the motors $M_{FR}$, $M_{FL}$, $M_{RR}$ and $M_{RL}$ which prevail at the occurrence of the previous timer interrupt. This timer interrupt routine is executed at a given time interval so that it will be seen that the value in the register $IA_{FR}$ from which the value in the register $IB_{FR}$ is subtracted, as shown at S256, corresponds to a rate of change in the current through the motor $M_{FR}$. At S256, this value is loaded into the register I and is comared against the threshold value I1 at S257. When the load on the motor increased and changes rapidly, the value in the register I, or the rate of change in the current exceeds the threshold value I1 (the motor $M_{FR}$ being overloaded), so that "FR abnormality" flag is set at S258.

Similarly, the rate of change in the current through the electric motor $M_{FL}$ is loaded into the register I at S259, and is compared against the threshold value I1 at S260 to detect any overloaded condition of the motor $M_{FL}$, whereupon "FL abnormality" flag is set at S261. AT S262, the rate of change in the current through the motor $M_{RR}$ is loaded into the register I, and is compared against the threshold value I1 at S263 to detect any overloaded condition of the motor $M_{RR}$, whereupon "RR abnormality" flat is set at S264. At S265, the rate of change in the current through the motor $M_{RL}$ is loaded into the register I, and is compared against the threshold value I1 at S266 to detect any overloaded condition of the motor $M_{RL}$, whereupon "RL abnormality" flag is set at S267. At S268, the content of the registers and addresses are returned to their original values, and the program returns to the main routine at the address or step which follows the address where the interrupt has occurred.

Returning to FIG. 8*g*, the value in the FR timer is loaded into the register t at S91, and is compared against the constant t5 at S92. As graphically when in FIG. 3, t5 represents the rise time for rotation in the forward direction when driving the window in the closing direction, and has a relatively small magnitude. If the value of t is less than t5 seconds, "FR abnormality" flag is reset at S94, and the program then proceeds to S124 and subsequent steps.

After repeatedly going through the control loop over a time interval which exceeds the rise time, and if "$MS_{FR}$" flag is reset as is "FR abnormality" flag (a situation in which any of these flags is set will be described later), the current through the motor $M_{FR}$ is examined at S100. The motor current is stored in the $IA_{FR}$ register at step S252 shown in FIG. 9, and hence the value in the register $IA_{FR}$ is compared against the motor lock current I2. If the motor current is equal to or less than I2, the program proceeds to S127 and subsequent steps. If an object is held sandwiched between the glass pane and the door frame during the FR window closing control, "FR abnormality" flag is set in response to the overloaded condition of the motor $M_{FR}$ (S258) during the timer interrupt routine of FIG. 9, and this flag is detected at S95, and "FRUP inhibit" flag and "FRAD" flag are set at S96 while resetting the flags relating to the FR window opening control, namely, "FRU" flag, "FRAU" flag and "FRI" flag, thus establishing the FR window abnormality processing mode.

The program then proceeds to S112 in FIG. 8*h*, and causes the FR window to be fully opened in the similar manner as in the automatic down operation. However, since the system is now in the FR window abnormality processing mode and "FRUP" flag is set, no response is made to a switch operation which commands an opening or closing of the FR window. When the lock current is detected for the motor $M_{FR}$ at S118, "FRUP inhibit" flag is reset to terminate the FR window abnormality processing mode, while ceasing the rotation of the motor $M_{FR}$ in the similar manner as mentioned previously.

When "FLU" flag is set at S81, it is detected at S126 (FIG. 8*i*), and 1 (H level) and 0 (L level) are established at the output ports O2 and O3, respectively, at S130, energizing the relay RY4 and deenergizing the relay RY3 to energize the motor $M_{FL}$ for rotation in the forward direction. If an object is held sandwiched between the glass pane and the door frame during the FL window closing control and the motor $M_{FL}$ becomes overloaded to set "FL abnormality" flag (S261 in FIG. 9), this flag is detected at S135, and "FLUP inhibit" flag and "FLAD" flag are set (S136) to establish the FL window abnormality processing mode. The program then proceeds to S152 in FIG. 8*j*, causing the FL window to be fully opened in the similar manner as in the automatic down operation. Any command to open or close the FL window during the time the FL window abnormality processing mode is established is neglected.

If "RRU" flag is set at S82, it is detected at S166 (FIG. 8*k*), and 1 (H level) and 0 (L level) are established at the output ports O4 and O5, respectively, at S192, energizing the relay RY6 and deenergizing the relay RY5. In this manner, the motor $M_{RR}$ is energized for rotation in the forward direction. If an object is held sandwiched between the glass pane and the door frame during the RR window closing control and the motor $M_{RR}$ becomes overloaded to set "RR abnormality" flag (S262 in FIG. 9), this flag is detected at S175, and "RRUP inhibit" flag and "RRAD" flag are set (S176), establishing the RR window abnormality processing mode. The program then proceeds to S192 in FIG. 8*l*, causing the RR window to be fully opened in the similar manner as in the automatic down operation. Any command to open or close the RR window during the time the RR window abnormality processing mode is established is neglected.

If "RLU" flag is set at S83, it is detected at S206 (FIG. 8*m*), and 1 (H level) and 0 (L level) are established at the output ports O6 and O7, respectively, at S210, energizing the relay RY8 and deenergizing the relay RY7. In this manner, the motor $M_{RL}$ for elevating the window associated with the RL door is energized for rotation in the forward direction. If an object is held sandwiched between the glass pane and the door frame during the RL window closing control and the motor $M_{RL}$ becomes overloaded to set "RL abnormality" flag (S267 in FIG. 9), this flag is detected at S215, and "RLUP inhibit" flag and "RLAD" flag are set (S216), establishing the RL window abnormality processing mode. The program then proceeds to S232 in FIG. 8*n*, causing the RL window to be fully opened in the similar manner as in the automatic down operation. Any command to open or close the RL window during the time the RL window abnormality processing mode is established is neglected.

Continuing the description of the operation according to the subparagraph $D_2$, when the depression or tilting of the up/down switch for the FR window at its up side is detected during the switch reading at S2, "FRU timer" flag is reset, and a value in the FRU timer is loaded into the register t for comparison against the constants t1 and t2 (S59, S60). Since "FRD" flag is already set, the length of time during which UP contact of the FR window remains on exceeds t2 seconds (the operation according to the subparagraph $D_2$) so that "FRU" flag is reset at S47.

At S81, if "FLU" flag is set, this flag is reset in response to the absence of the depression or tilting of the up/down switch for the FL window at its up side. At S82, if "RRU" flag is set, this flag is reset in response to the absence of the depression or tilting of the up/down switch for the RR window at its up side. At S83, if "RLU" flag is set, this flag is reset in response to the absence of the depression or tilting of the up/down switch for the RL window at its up side.

When "FRU" flag is reset, the program proceeds through S86 to S87 to S88 in FIG. 8*g*. Since now 0 (L level) is established at the output port O1 to energize the motor $M_{FR}$ for rotation in the forward direction, 1 (H level) is established at the both output ports O0 and O1 at S103, deenergizing the relays RY1 and RY2. This ceases the rotation of the motor $M_{FR}$, and the FR window comes to a stop at this location. "FR timer" flag and "FR abnormality" flag are now reset, and the program proceeds to S106 and subsequent steps since "FR single operation" flag is not set.

If "FLU" flag is reset after it has been set at S81, 0 (L level) is established at the output port O3 to energize the motor $M_{FL}$ for rotation in the forward direction. Accordingly, at S143 (FIG. 8*i*), 1 (H level) is established at the both output ports O2 and O3, deenergizing the relays RY3 and RY4. This ceases the rotation of the motor $M_{FL}$, and the FL window comes to a stop at this location. Subsequently, given flags are reset, and the program proceeds to S146 and subsequent steps since it is determined at the following step S144 that "FL single operation" flag is not set.

If "RRU" flag is reset after it has been set at S82, 0 (L level) is established at the output port O5 to energize the motor $M_{FR}$ for rotation in the forward direction. Accordingly, at S183 (FIG. 8*k*), 1 (H level) is established at the both output ports O4 and O5, deenergizing the relays RY5 and RY6. This ceases the rotation of the motor $M_{RR}$, and the RR window comes to a stop at this location. Subsequently, given flags are reset, and the program proceeds to S186 and subsequent steps since it is determined at the following step S184 that "RR single operation" flag is not set.

If "RLU" flag is reset after it has been set at S83, 0 (L level) is established at the output port O7 to energize the motor $M_{RL}$ for rotation in the forward direction. Accordingly, at S223 (FIG. 8*m*), 1 (H level) is established at the both output ports O6 and O7, deenergizing the relays RY7 and RY8. This ceases the rotation of the motor $M_{RL}$, and the RL window comes to a stop at this location. Subsequently, given flags are reset, and the program returns to S2 and subsequent steps since it is determined at the following step S224 that "RL single operation" flag is not set.

The above covers the window opening control responsive to an operation according to the subparagraph $D_2$. The situation in which the depression or tilting of the up side switch is continued to cause the window to be fully closed and the motor lock current is detected will be treated by the control responsive to an operation according to the subparagraph $D_8$.

(5) A window opening control responsive to an operation according to the subparagraph $D_2'$ will now be described. The processing operation up to the point where the on condition of the up/down switch for the FR window at its up side which continues over a time interval exceeding t1 seconds is detected and "FRU" flag, "FRAU" flag, "FRD" flag, "FRAD" flag and "FRI" flag are reset at S40 remains quite the same as the processing operation described above in connection with the paragraph (4), and therefore will not be described again. If the depression or tilting of the up/-down switch for the FR window at its up side is terminated before the timer which determines the time duration during which this switch remains on exceeds the time interval t2 (S42 to S45), this means that the operation according to the subparagraph $D_2'$ has taken place. Accordingly, "FRU" flag indicating the FR window closing control and "FRI" flag indicating incremental window opening control or inching operation are set.

At S81, "FLU" flag and "FLI" flag are set when the up/down switch for the FL window is depressed for tilted at its up side for a time interval greater than t1 seconds and less than t2 seconds. At S82, "RRU" flag and "RRI" flag are set if the switch has been depressed or tilted at its up side for a time interval greater than t1 seconds and less than t2 seconds. At S83, "RLU" flag and "RLI" flag are set if the up/down switch for the RL window has been depressed or tilted at its up side for a time interval greater than t1 seconds and less than t2 seconds.

The processing operation up to the point where "FRU" flag is detected at S86 to establish 1 (H level) and 0 (L level) at the output ports O0 and O1, respectively, to energize the motor $M_{FR}$ for rotation in the forward direction, following by waiting for the rise time (t5 seconds) for the rotation in the forward direction to pass, remains quite the same as that described under the paragraph (4) and therefore will not be described again. When the rise time (t5 seconds) for the rotation of the motor $M_{FR}$ in the forward direction has passed, "FRI" flag is detected at S97. At S98, the value in the register t is compared against the time duration t3 for the motor rotation in the forward direction which is required to perform an incremental window closing, and if the value is less then t3 seconds, the program goes through the control loop another time. In this embodiment, the value of t3 is chosen as a time interval which is required to close the glass pane through a distance of 10 mm. When the motor $M_{FR}$ is energized for rotation in the forward direction over a time interval which exceeds t3 seconds, "FRI" flag is reset at S99, "FRU" flag is reset at S102 ("FRAD" flag being reset), and the program proceeds to S103. At S103, 1 (H level) is established at the both output ports O0 and O1, deenergizing the relays RY1 and RY2. This ceases the rotation of the motor $M_{FR}$, and the FR window comes to a stop after having been raised through a given incremental distance (10 mm).

If an object is held sandwiched between the glass pane and the door frame during the FR window closing control, the motor $M_{FR}$ becomes overloaded to set "FR abnormality" flag (S258) in the timer interrupt routine of FIG. 9, and this flag is detected at S95, and "FRUP inhibit" flag and "FRAD" flag are set at S96, followed by resetting the flags relating to the FR window opening control, namely, "FRU" flag, "FRAU" flag and "FRI" flag, thus establishing the FR window abnormality processing mode. The program then proceeds to S112 shown in FIG. 8*e*, causing the FR window to be fully opened in the similar manner as in the automatic down operation. However, since the system is now in the FR abnormality processing mode and "FRUP inhibit" flag is set, no response is made to any switch operation commanding the FR window to be opened or closed. When the lock current is detected for the motor $M_{FR}$ at S118, "FRUP inhibit" flag is reset to terminate the FR window abnormality processing mode, thus ceasing the motor $M_{FR}$.

If "FLU" flag and "FLI" flag are set at S81, 1 (H level) and 0 (L level) are established at the output ports O2 and O3, respectively, at S130 in FIG. 8*i*, energizing the motor $M_{FL}$ for rotation in the forward direction. Subsequently, when the given time interval t3 seconds has passed, 1 (H level) is established at the both output ports O2 and O3 to deenergize the motor (S143).

If an object is held sandwiched between the glass pane and the door frame during the FL window closing control and the motor $M_{FL}$ becomes overloaded to set "FL abnormality" flag (S261) in FIG. 9, this flag is detected at S135, and "FLUP inhibit" flag and "FLAD" flag are set (S136), establishing the FL window abnormality processing mode. The program then proceeds to S152 in FIG. 8j, causing the FL window to be fully opened in the similar manner as in the automatic down operation. Any command to open or close the FL window during the time the FL window abnormality processing mode is established is neglected.

If "RRU" flag and "RRI" flag are set at S82, 1 (H level) and 0 (L level) are established at the output ports O4 and O5, respectively, at S170 in FIG. 8k, energizing the motor $M_{RR}$ for rotation in the forward direction. Subsequently, when the given time interval t3 seconds has passed, 1 (H level) is established at the both output ports O4 and O5 to deenergize the motor (S183).

If an object is held sandwiched between the glass pane and the door frame during the RR window closing control and the motor $M_{RR}$ becomes overloaded to set "RR abnormality" flag (S262 in FIG. 9), this flag is detected at S175, and "RRUP inhibit" flag and "RRAD" flag are set (S176), establishing the RR window abnormality processing mode. The program then proceeds to S192 in FIG. 8l, causing the RR window to be fully opened in the similar manner as in the automatic down operation. Any command to open or close the RR window during the time the RR window abnormality processing mode is established is neglected.

If "RLU" flag and "RLI" flag are set at S83, 1 (H level) and 0 (L level) are established at the output ports O6 and O7, respectively, at S210 in FIG. 8m, energizing the motor $M_{RL}$ for rotation in the forward direction. Subsequently, when the given time interval t3 seconds has passed, 1 (H level) is established at both output ports O6 and O7 to deenergize the motor (S223).

If an object is held sandwiched between the glass pane and the door frame during the RL window closing control and the motor $M_{RL}$ becomes overloaded to set "RL abnormality" flag (S267) in FIG. 9, this flag is detected at S215, and "RLUP inhibit" flag and "RLAD" flag are set (S216), establishing the RL window abnormality processing mode. The program then proceeds at S232 in FIG. 8n, causing the RL window to be fully opened in the similar manner as in the automatic down operation. Any command to open or close the RL window during the time the RL window abnormality processing mode is established is neglected.

The above covers the window opening control responsive to the operation under the subparagraph $D_2'$.

(6) A control which is responsive to an operation according to the subparagraph $D_4$ will now be described. If the depression of the automatic up/down switch for the FR window at its automatic up side is detected during the switch reading at S2 and is detected at S63, the program proceeeds to S81 and subsequent steps if it is found at S64 that "FR fully closed" flag is set since then the FR window has been fully closed and the glass pane cannot be further raised. Otherwise, "FRAU timer" flag is set in response to the detection of the initial switch operation, and the FRAU timer is reset and started (S65 and S66).

Subsequently, the program goes through the loop for the normal window opening/closing control mode which begins with S81 once, and when it returns to S65 again, the value in the FRAU timer is loaded into the register t (S67) for comparison against the constant t1 (S68) since now "FRAU timer" flag is set. As mentioned previously, when AUTO UP contact of the FR window remains on for a time interval which is less than t1 seconds, this may be a result of chattering which is caused by oscillations of the vehicle. Accordingly, the program waits for the time interval to exceed to seconds while remaining in this loop, and when it exceeds, "FRAU" flag is set at S69, and the other flags relating to the opening/closing control of the FR window, namely, "FRU" flag, "FRD" flag, "FRAD" flag and "FRI" flag are reset. This changes the control to one which corresponds to a new switch operation for the FR window (the depression of the automatic up side). When the switch ceases to be depressed at its automatic up side, "FRAD timer" flag which has been set is reset at S71.

At S81, "FLAU" flag is set in response to the depression of the automatic up/down switch for the FL window at its automatic up side. At S82, "RRAU" flag is set in response to the depression of the automatic up/-down switch for the RR window at its automatic up side. At S83, "RLAU" flag is set in response to the depression of the automatic up/down switch for the RL window at its automatic up side.

The subsequent processing operation where the program proceeds to S86 to S86 to detect "FRAU" flag and 1 (H level) and 0 (L level) are established at the output ports O0 and O1, respectively, to energize the motor $M_{FR}$ for forward rotation, followed by waiting for the rise time (t5 seconds) for rotation in the forward direction passes, is the same as that mentioned under the paragraph (4), and therefore will not be described again. When the rise time (t5 seconds) for the motor $M_{FR}$ in its rotation in the forward direction passes, the current through the motor $M_{FR}$ is examined at S100. The value in the register $IA_{FR}$ is compared against the motor lock current value I2, and if the motor current is equal to or less than I2, the program proceeds to S124 and subsequent steps.

If an object is held sandwiched between the glass pane of the FR window and the door frame while circulating the loop, "FR abnormality" flag is set (S258) as the motor $M_{FR}$ is overloaded, in the timer interrupt routine of FIG. 9. Accordingly, this flag is detected at S95, and "FRUP inhibit" flag and "FRAD" flag are set at S96 while resetting the flags relating to the FR window opening control, namely, "FRU" flag, "FRAU" flag and "FRI" flag, thus establishing the FR window abnormality processing mode. The program then proceeds to S112 shown in FIG. 8h, causing the FR window to be fully opened in the similar manner as in the automatic down control, except that no response is made to a switch operation commanding to open or close the FR window since the system is now in the FR window abnormality processing mode and "FRUP inhibit" flag is set. When the lock current is detected for the motor $M_{FR}$ at S118, "FRUP inhibit" flag is reset to terminate the FR window abnormality processing mode, ceasing the rotation of the motor $M_{FR}$.

When the FR window is raised without any abnormality and moves into the door frame until its front end begins to compress the weather strip (6 in FIG. 2) in response to the rotation of the motor $M_{FR}$ in the forward direction, the limit switch $MS_{FR}$ is turned off and this is read to set "$MS_{FR}$" flag at S12 (FIG. 8a). Sunsequently, the weather strip continues to be compressed and the motor current increases until "FR abnormality" flag is set in the timer interrupt routine in FIG. 9, However, since the front end of the glass pane of the FR window has already moved into the door frame, removing any likelihood that an object can be held sandwiched, the flag is reset (S93). When this loop is repeated to allow the glass pane of the FR window to be raised to its fully closed position and the motor $M_{FR}$ is locked to cause the motor current to exceed I2, the full closure of the FR window is detected to set "FR fully closed" flag at S101 and to reset "FRAU" flag at S102 ("FRU" flag being reset). Subsequently, the program proceeds to S103, where 1 (H level) is established at the output ports O0 and O1 to deenergize the relays RY1 and RY2 to cease the rotation of the motor $M_{FR}$. At this time, "FR abnormality" flag which has been set after "$MS_{FR}$" flag had been set is reset, and "FR timer" flag is reset. The program then proceeds to S106 and subsequent steps since it is determined at S104 that "FR single operation" flag is not set.

If "FLAU" flag is set at S81, it is detected at S127 (FIG. 8*i*), establishing 1 (H level) and 0 (L level) at the output ports O2 and O3, respectively, at S130 to energize the relay RY4 and to deenergize the relay RY3, thus energizing the motor $M_{FL}$ for rotation in the forward direction. Subsequently, if an object is held sandwiched between the glass pane of the FL window and the door frame before "$MS_{FL}$" flag is set, the motor $M_{FL}$ becomes overloaded, whereby "FL abnormality" flag is set (S261 in FIG. 9), causing the FL window to be fully opened in the similar manner as mentioned before. When the FL window is raised with no abnormality and after the lock current for the motor $M_{FL}$ of the FL door is detected (S140) after having set "$MS_{FL}$" flag, "FL fully closed" flag is set (S141) and "FLAU" flag is reset (S142), the program then proceeding to S143. At this step, 1 (H level) is established at the both output ports O2 and O3 to deenergize the relays RY3 and RY4 to cease the rotation of the motor $M_{FL}$. After resetting the given flags, the program proceeds to S144 to S146 and subsequent steps since it is found at S144 that "FL single operation" flag is not set.

If "RRAU" flag is set at S82, it is detected at S167 (FIG. 8*k*), and 1 (H level) and 0 (L level) are established at the output ports O4 and O5, respectively, at S170, to energize the relay RY6 and to deenergize the relay RY5, thus energizing the motor $M_{RR}$ for rotation in the forward direction. Subsequently, if an object is held sandwiched between the glass pane of the RR window and the door frame before "$MS_{RR}$" flag is set, the motor $M_{RR}$ becomes overloaded to set "RR abnormality" flag (S264 in FIG. 9), causing the RR window to be fully opened as mentioned before. When the RR window is raised with no abnormality, and the lock current for the motor $M_{RR}$ is detected (S180) after having set "$MS_{RR}$" flag (S12), "RR fully closed" flag is set (S181) while "RRAU" flag is reset (S182), the program then proceeding to S183. At this step, 1 (H level) is established at the both output ports O4 and O5 to deenergize the relays RY5 and RY6 to cease the rotation of the motor $M_{RR}$. After having reset the given flags, the program proceeds to S186 and subsequent steps since it is determined at the following step S184 that "RR single operation" flag is not set.

If "RLAU" flag is set at S83, it is detected at S207 (FIG. 8*m*), and 1 (H level) and 0 (L level) are established at the output ports O6 and O7, respectively, at S210, to energize the relay RY8 and to deenergize the relay RY7, thus energizing the motor $M_{RL}$ for the RL door for rotation in the forward direction. If an object is subsequently held sandwiched between the glass pane of the RL window and the door frame before "$MS_{RL}$" flag is set, the motor $M_{RL}$ becomes overloaded to set "RL abnormality" flag (S267 in FIG. 9), causing the RL window to be fully opened. When the RL window is raised with no abnormality, and the lock current for the motor $M_{RL}$ is detected (S220) after having set "$MS_{RL}$" flag, "RL fully closed" flag is set (S221) while "RLAU" flag is reset (S222), the program then proceeding to S223. At this step, 1 (H level) is established at the both output ports O6 and O7 to deenergize the relays RY7 and RY8 to cease the rotation of the motor $M_{RL}$. After having reset the given flags, the program proceeds to S226 and subsequent steps since it is determined at the following step S224 that "RL single operation" flag is not set. The above has described the window closing control responsive to the operation according to the subparagraph $D_4$ (automatic up operation).

It is to be understood that the control according to the paragraphs (1) to (6) is executed each time a switch operation according to the paragraph D ($D_1$ to $D_4$) takes place. When the driver of the vehicle performs an operation according to the paragraph D, or when the engine is stopped and the ignition key is withdrawn (IG key switch off), the status of the IG key switch is read at S2 (FIG. 8*a*), and is detected at S3. Since the ignition key had been inserted by that time and "IG key" flag has been set (S6), "IG key withdrawal" flag is set at S7 while resetting "IG key" flag. It is to be noted that there has been an operation to open or close the FR door subsequent to the termination of the standby mode at S5 and "FR door open/closed" flag has once been set, this flag is now reset. In addition, at S7, "FR single operation" flag, "FL single operation" flag, "RR single operation" flag and "RL single operation" flag are set, enabling a window opening/closing control according to one of the paragraphs (1) to (6) only once for each window. This aspect will now be described.

When FR up/down switch has been operated at its down side and "FRD" flag is set, the program proceeds to S106 to S107 to detect this fact at S108 (FIG. 8*h*), energizing the motor $M_{FR}$ for rotation in the reverse direction, thus executing the FR window opening control. Subsequently, when the FR up/down switch ceases to be operated and "FRD" flag is reset, the program then proceeds through S106-S107-S108-S109-S110 shown in FIG. 8*h*. Since the motor $M_{FR}$ is energized for rotation in the reverse direction, the output port O0 assumes 0 (L level), and thus the program proceeds from S110 to S121, deenergizing the motor $M_{FR}$. The FR window opening control up to this point is substantially similar to the control according to the paragraph (1) even though there is a small difference in the steps which are passed. However, when "FR single operation" flag is detected at S122, this flag is reset and "FR fully closed" flag is set at S123. The function of the "FR fully closed" flag which is now set will be described later. Subsequently, when a switch operation takes place which commands to open or close the FR window, "FR single operation" flag is reset, thus preventing a corresponding control from being effected.

Similarly, if the operation according to the subparagraph $D_1'$, namely, incremental FR window opening command (inching command) is provided when "FR single operation" flag is set, the incremental FR window opening control is executed in substantially similar manner as the control according to the paragraph (2), followed by setting "FR fully closed" flag and resetting "FR single operation" flag. When "FR single operation" flag is set and the operation according to the subparagraph $D_3$ or the FR window automatic down command is provided, the FR window opening control is executed in substantially the same manner as the control according to the paragraph (3), followed by setting "FR fully closed" flag and resetting "FR single operation" flag. When "FR single operation" flag is set and the operation according to the subparagraph $D_2$ or the FR window up command is provided, the FR window closing control is executed in substantially the same manner as the control according to the paragraph (4), followed by setting "FR fully closed" flag and resetting "FR single operation" flag. When "FR single operation" flag is set and the operation according to the subparagraph $D_2'$ or a command for incremental FR window closing (inching) is provided, the incremental FR window opening control is executed in substantially the same manner as the control according to the paragraph (5), followed by setting "FR fully closed" flag and resetting "FR single operation" flag. When "FR single operation" flag is set and the operation according to the subparagraph $D_4'$ or the FR window automatic up command is provided, the FR window closing control is executed in substantially the same manner as the control according to the paragraph (6), followed by setting "FR fully closed" flag and resetting "FR single operation" flag.

The same applies to the FL window, RR window and RL window. Specifically, when "FL single operation" flag is set, a control according to one of the paragraphs (1) to (6) responsive to an operation according to the paragraph D for the FL window is executed, and upon completion thereof, "FL fully closed" flag is set while "FL single operation" flag is reset. When "RR single operation" flag is set, a control according to one of the paragraphs (1) to (6) responsive to an operation according to the paragraph D for the RR window is executed, and upon completion thereof, "RR fully closed" flag is set while "RR single operation" flag is reset. When "RL single operation" flag is set, a control according to one of the paragraphs (1) to (6) responsive to an operation according to the paragraph D for the RL window is executed, and upon completion thereof, "RL fully closed" flag is set while "RL single operation" flag is reset.

In this manner, a window opening/closing control responsive to a switch operation according to the paragraph D ($D_1$ to $D_4$) is allowed to be executed only once for each window even after the ignition key has been withdrawn.

When the driver of the vehicle unlocks and opens the FR door (an operation according to the paragraph G), the courtesy switch $OC_{FR}$ which detects the opening or closing of the FR door is turned on. This condition is read at S2 (FIG. 8*a*), and is detected at S13. In response thereto, since "FR door open" flag is reset (S14*a*), "FR door open" flag is set at S14*b* while "FR door open/-closed" flag is reset.

When the driver gets out of the vehicle and closes the FR door, the courtesy switch $OC_{FR}$ which detects the opening or closing of the FR door is turned off. This is read at S2 (FIG. 8*a*) and is detected at S13. since "FR door open" flag is set (S15), this means that the FR door has once been opened and then closed. Accordingly, "FR door open/closed" flag is set and "FR door open" flag is reset at S16.

It will be understood that each door lock is operated upon either while the door is open or after the door is closed (see the paragraph H). In each instance, when the FR door, FL door, RR door and RL door are closed (S18 to S21: all of the courtesy switches $OC_{FR}$, $OC_{FL}$, $OC_{RR}$, and $OC_{RL}$ being off; all the doors being closed) and the FR door lock, FL door lock, RR door lock and RL door lock are activated (S22 to S25: each door lock/unlock switch $DL_{FR}$, $DL_{FL}$, $DL_{RR}$ and $DL_{RL}$ being off; all the doors being locked), the stopped condition of the vehicle is detected, and "FR single operation" flag, "FL single operation" flag, "RR single operation" flag and "RL single operation" flag are reset at S26, establishing the failure-to-close preventing mode, which will now be described in detail.

When the glass pane of the FR window has been raised to its fully closed position, "FR fully closed" flag is found to be set at S27, whereby the failure-to-close preventing control for the FR window is not executed. In the event the FR window opening/closing control is executed in response to a corresponding command after the ignition key has been withdrawn, a failure of the glass pane of the FR window to be raised to its fully closed position signifies an intentional opening of the FR window for the purpose of preventing a temperature rise within the vehicle, and "FR fully closed" flag is set, so that the failure-to-close preventing control for the FR window is not executed.

When "FR fully closed" flag is not set at S27, the program proceeds to S89 through S90 shown in FIG. 8*g*. Since "FR timer" flag is not set, it is set here, and 1 (H level) and 0 (L level) are established at the output ports O0 and O1, respectively, to energize the relay RY2 and to deenergize the relay RY1, thus energizing the motor $M_{FR}$ for the FR door for rotation in the forward direction. The length of time during which the motor is energized for rotation in the forward direction is determined by resetting and starting the FR timer.

The value in the FR timer is loaded into the register t at S91, and is compared against the constant t5 at S92. If the value of t is less than t5 seconds, this means it is now during the rise time of the motor $M_{FR}$ in its rotation in the forward direction. Accordingly, "FR abnormality" flag is reset at S94, and the program proceeds to S124-S125-S164-S165-S204-S205-S2- . . . -S27-S89-S91, thus circulating through the control loop. If the rise time (t5 seconds) passes in the meantime and if "$MS_{FR}$" flag and "FR abnormality" flag are not set (S93 and S94), the motor current for the motor $M_{FR}$ is examined at S100 since "FRI" flag is not set. The value in the register $IA_{FR}$ is compared against the motor lock current value I2, and if the motor current is equal to or less than I2, the program repeatedly circulates the loop comprising S124-S125-S164-S165-S204-S205-S2- . . . -S27-S89-S91-S92-S93-S95-S97-S100-S124- . . . .

If an object is held sandwiched between the glass pane of the FR window and the door frame during the time the program loops around in this manner, "FR abnormality" flag is set (S258), as a result of the motor $M_{FR}$ being overloaded, in the timer interrupt routine in FIG. 9, and hence this flag is detected at S95, and "FRUP inhibit" flag and "FRAD" flag are set at S96. The program then proceeds to S112 shown in FIG. 8*h* where 0 (L level) and 1 (H level) are established at the output ports O0 and O1, respectively, to energize the relay RY1 and to deenergize the relay RY2, thus energizing the motor $M_{FR}$ for rotation in the reverse direction. Subsequently, a control loop is defined by steps including S112-S113-S114-S115-S118-S124-S125-S164-S165-S204-S205-S2- . . . -S27-S89-S91-S92-S93-S95-S96-S112- . . . . The program circulates through the loop until the lock current for the motor $M_{FR}$ of the FR door is detected at S118.

When the FR window is lowered to its fully open position and the lock current is detected for the motor $M_{FR}$ at S118, 1 (H level) is established at the both output ports O0 and O1, deenergizing the motor $M_{FR}$. Subsequently, the program proceeds through S124-S125-S164-S165-S204-S205-S2- . . . . Since "FR door fully closed" flag remains reset, the program proceeds from S27 to S89, executing the failure-to-close preventing control for the FR window which controls the glass pane of the FR window to be fully closed.

When the glass pane of the FR window is raised normally as the motor $M_{FR}$ is energized for rotation in the forward direction, and the front end of the glass pane moves into the door frame and begins to compress the weather strip (6 in FIG. 2), the position detecting limit switch $MS_{FR}$ is turned off, and "$MS_{FR}$" flag is set at S10 shown in FIG. 8*d*. Subsequently, as the weather strip is further compressed and the motor current increases, "FR abnormality" flag is set in the timer interrupt routine shown in FIG. 9. However, since the glass pane of the FR window has moved into the door frame (see FIG. 2), and there is no likelihood that an object can be held sandwiched, this flag is cancelled or reset (S93). As the programs circulate through the loop and the glass pane of the FR window is raised to its fully closed position to cause the motor $M_{FR}$ to be locked, causing the motor current to exceed I2, this fact is detected as representing the fully closed condition of the FR window, the "FR fully closed" flag is set at S101. At S103, 1 (H level) is established at the both output ports O0 and O1 to deenergize the motor $M_{FR}$, resetting "FR timer" flag and "FR abnormality" flag which has been set after "$MS_{FR}$" flag has been set. Subsequently, the program proceeds through S103-S104-S124-S125-S164-S165-S204-S205-S2-. The program then proceeds to S28 since now "FR fully closed" flag is set.

If it is found at S28 that "FL closed" flag is not set, the failure-to-close preventing control for the FL window is executed. This control is executed by a procedure which is similar to that used in the failure-to-close preventing control for the FR window mentioned above. If "FL fully closed" flag is found not to be set, the program proceeds to S129 shown in FIG. 8*i* where 1 (H level) and 0 (L level) are established at the output ports O2 and O3, respectively, to energize the motor $M_{FL}$ for rotation in the forward direction. The time during which the motor is energized for rotation in the forward direction is determined by the FL timer, and the program circulates through a control loop including S164-S165-S204-S205-S2- . . . -S27-S28-S129-S131-S132-S134 . . . until the rise time for the motor $M_{FL}$ for its rotation in the forward direction passes. When the rise time (t5 seconds) passes, the program repeatedly circulates through a loop including S140-S164-S165-S204-S205-S2- . . . -S28-S129-S131-S132-S133-S135-S137-S140- . . . while monitoring the current through the motor $M_{FL}$ at S140.

If an object is held sandwiched between the glass pane of the FL window and the door frame during the time the program circulates through the loop, "FL abnormality" is established. In response thereto, the program proceeds to S152 shown in FIG. 8*j* to establish 0 (L level) and 1 (H level) at the output ports O2 and O3, energizing the motor $M_{FL}$ for rotation in the reverse direction. Subsequently, the program circulates through a control loop including S152-S153-S154-S155-S158-S164-S165-S204-S205-S2- . . . -S28-S129-S131-S132-S133-S135-S136-S152- . . . until the FL window is fully opened and the lock current is detected for the motor $M_{FL}$. When the FL window has been lowered to its fully open position and the lock current is detected for the motor $M_{FL}$ at S158, 1 (H level) is established at both output ports O2 and O3, deenergizing the motor $M_{FL}$. Subsequently, the program proceeds through S164-S165-S204-S205-S2- . . . but since "FL door fully closed" flag remains reset, the program proceeds from S28 to S129, again executing the failure-to-close preventing control for the FL window.

When the glass pane of the FL window is raised with no abnormality and its front end moves into the door frame and compresses the weather strip 6 (FIG. 2), the position detecting limit switch $MS_{FL}$ is turned off, and "$MS_{FL}$" flag is set at S12 shown in FIG. 8*a*. Subsequently, when the weather strip 6 is further compressed, and the motor $M_{FL}$ has locked, causing the motor current to exceed I2, the fully closed condition of the FL window is detected. Thus, "FL fully closed" flag is set at S141, and the motor $M_{FL}$ is deenergized at S143. Subsequently, the program proceeds through S143-S144-S164-S165-S204-S205-S2- . . . , but when it reaches the step S28, it then proceeds to S29 since now "FL fully closed" flag is set.

If it is found at S29 that ×RR fully closed" flag is not set, the failure-to-close preventing control for the RR window is executed in quite the similar manner as the corresponding control for the FR window. When it is found at S29 that "RR fully closed" flag is not set, the program proceeds to S169 shown in FIG. 8*k* where 1 (H level) and 0 (L level) are established at the output ports O4 and O5, respectively, energizing the motor $M_{RR}$ for the RR door for rotation in the forward direction. The length of time during which the motor is energized for rotation in the forward direction is determined by the RR timer, and the program circulates through a control loop including S204-S205-S2- . . . -S29-S169-S171-S172-S174- . . . until the rise time for the motor $M_{RR}$ passes. When the rise time (t5 seconds) passes, the program circulates through the loop including S180-S204-S205-S2- . . . -S29-S169-S171-S172-S173-S175-S177-S180- . . . while monitoring the current through the motor $M_{RR}$ at S180.

If an object is held sandwiched between the glass pane of the RR window and the door frame during the time the program circulates through the loop, "RR abnormality" is established. In response thereto, the program proceeds to S192 in FIG. 8*l* where 0 (L level) and 1 (H level) are established at the output ports O4 and 05, respectively, energizing the motor $M_{RR}$ for rotation in the reverse direction. The program then circulates through the control loop including S192-S193-S194-S195-S198-S204-S205-S2- . . . -S29-S169-S171-S172-S173-S175-S176-S192- . . . until the RR window is fully open and the lock current is detected for the motor $M_{RR}$. When the RR window is lowered to its fully open position and the lock current is detected for the motor $M_{RR}$ at S198, 1 (H level) is established at the both output ports O4 and O5, deenergizing the motor $M_{RR}$. Subsequently, the program proceeds S204-S205-S2- . . . , but since "RR door fully closed" flag remains reset, the program proceeds from S29 to S169, again executing the failure-to-close preventing control for the RR window.

When the glass pane of the RR window is raised with no abnormality and its front end moves into the door frame to compress the weather strip (6 in FIG. 2), the position detecting limiting switch $MS_{RR}$ is turned off, and "$MS_{RR}$" flag is set at S12 in FIG. 8a. Subsequently, as the weather strip is further compressed and the motor $M_{RR}$ has locked, causing the motor current to exceed I2, the fully closed condition of the RR window is detected, and "RR fully closed" flag is set at S181, and the motor $M_{RR}$ is deenergized at S183. The program then proceeds through S183-S184-S204-S205-S2- . . . , but when it reaches the step S29, it then proceeds to S30 since now "RR fully closed" flag is set.

If it is found at S30 that "RL fully closed" flag is not set, the failure-to-close preventing control for the RL window is executed in substantially the similar manner as the corresponding control for the FR window. When "RL fully closed" flag is found not to be set at S30, the program proceeds to S209 shown in FIG. 8m where 1 (H level) and 0 (L level) are established at the output ports O6 and O7, respectively, to energize the motor $M_{FL}$ for the RL door for rotation in the forward direction. The length of time during which the motor is energized for rotation in the forward direction is determined by the RL timer, and the program circulates around the control loop including S2- . . . -S30-S209-S211-S212-S214- . . . until the rise time for the motor passes. When the rise time (t5 seconds) passes, the program repeatedly goes through the loop including S220-S2- . . . -S30-S209-S211-S212-S213-S215-S217-S220- . . . while monitoring the current through the motor $M_{RL}$ at S220.

If an object is held sandwiched between the glass pane of the RL window and the door frame during the time the program circulates through the loop, "RL abnormality" is established. In response thereto, the program proceeds to S232 in FIG. 8n where 0 (L level) and 1 (H level) are established at the output ports O6 and O7, energizing the motor $M_{RL}$ for rotation in the reverse direction. The program then goes through the control loop including S232-S233-S234-S235-S238-S2- . . . -S30-S209-S211-S212-S213-S215-S216-S232- . . . until the RL window is fully open and the lock current is detected for the motor $M_{RL}$. When the RL window has been lowered to its fully open position and the lock current is detected for the motor $M_{RL}$ at S238, 1 (H level) is established at the both output ports O6 and O7, to deenergize the motor $M_{RL}$. The program then proceeds S2, but since "RL door fully closed" flag remains reset, it then proceeds from S30 to S209, again executing the failure-to-close preventing control for the RL window.

When the glass pane of the RL window is raised with no abnormality and its front end moves into the door frame to compress the weather strip (6 in FIG. 2), the position detecting limit switch $MS_{RL}$ is turned off, and "$MS_{RL}$" flag is set at S12 in FIG. 8a. Subsequently, as the weather strip is further compressed and the motor $M_{RL}$ has locked, causing the motor current to exceed I2, this allows the fully closed condition of the RL window to be detected. Accordingly, "RL fully closed" flag is set at S221, and the motor $M_{RL}$ is deenergized at S223. Subsequently, the program proceeds through S223-S224-S2- . . . , and when it reaches S30, the failure-to-close preventing control for all of the four windows has been completed since now "RR fully closed" flag is set.

The failure-to-close preventing control is executed when the engine is stopped and there is no charging of the battery mounted on the vehicle. As mentioned previously, any window which has been forgotten to be closed is sequentially detected in the sequence of the FR window, FL window, RR window and RL window to trigger the execution of the window closing control, thus eliminating an exhaustion of the storage battery mounted on the vehicle due to excessive current flow.

When the failure-to-close preventing control has been completed, "standby" flag is set at S31 while "IG key withdrawal" flag and "FR open/close" flag are reset. The program then circulates through S2-S3-S6-S8-S2-; establishing the standby mode in which the program waits for the ignition key to be inserted into the receptacle to turn the IG key switch on. During the standby mode, 1 (H level) is established at the output port O8 to deenergize the relay RY9, thus activating the theft preventing circuit I2. Accordingly, if any of the FR window, FL window, RR window and RL window is forcibly opened during such interval, one of the electric motors $M_{FR}$, $M_{FL}$, $M_{RR}$ and $M_{RL}$ which is engaged with that window is set in motion, developing an electromotive force across its terminal. The electromotive force is detected to energize the buzzer Bz as mentioned previously.

In the described embodiment, any window which has been mistakenly left open is sequentially detected and subject to the window closing control, in the sequence of the FR window, FL window, RR window and RL window. Thus, where more than one window has been left open one window is closed, followed by closing another window, each time performing a window closing control for one of the windows. The reason for this is that the failure-to-close preventing control is executed during the time when the engine is stopped and the battery on the vehicle is not being charged. If a plurality of drive motors associated with a plurality of windows are simultaneously energized, there occurs an excessive current flow which causes an early exhaustion of the battery. However, where the battery mounted has an increased capacity, a plurality of windows may be subject to a simultaneous window closing control, thus expediting the control and minimizing the time during which the window or windows remain open. It will be appreciated that there is no significant increase in the load upon the battery if the rush-in current during the starting of the motor is slightly displaced from each other. Accordingly, in a modification of the invention, a window closing control is executed substantially simultaneously for a plurality of windows which remain open as a result of forgetting to close them.

Figure 10A:
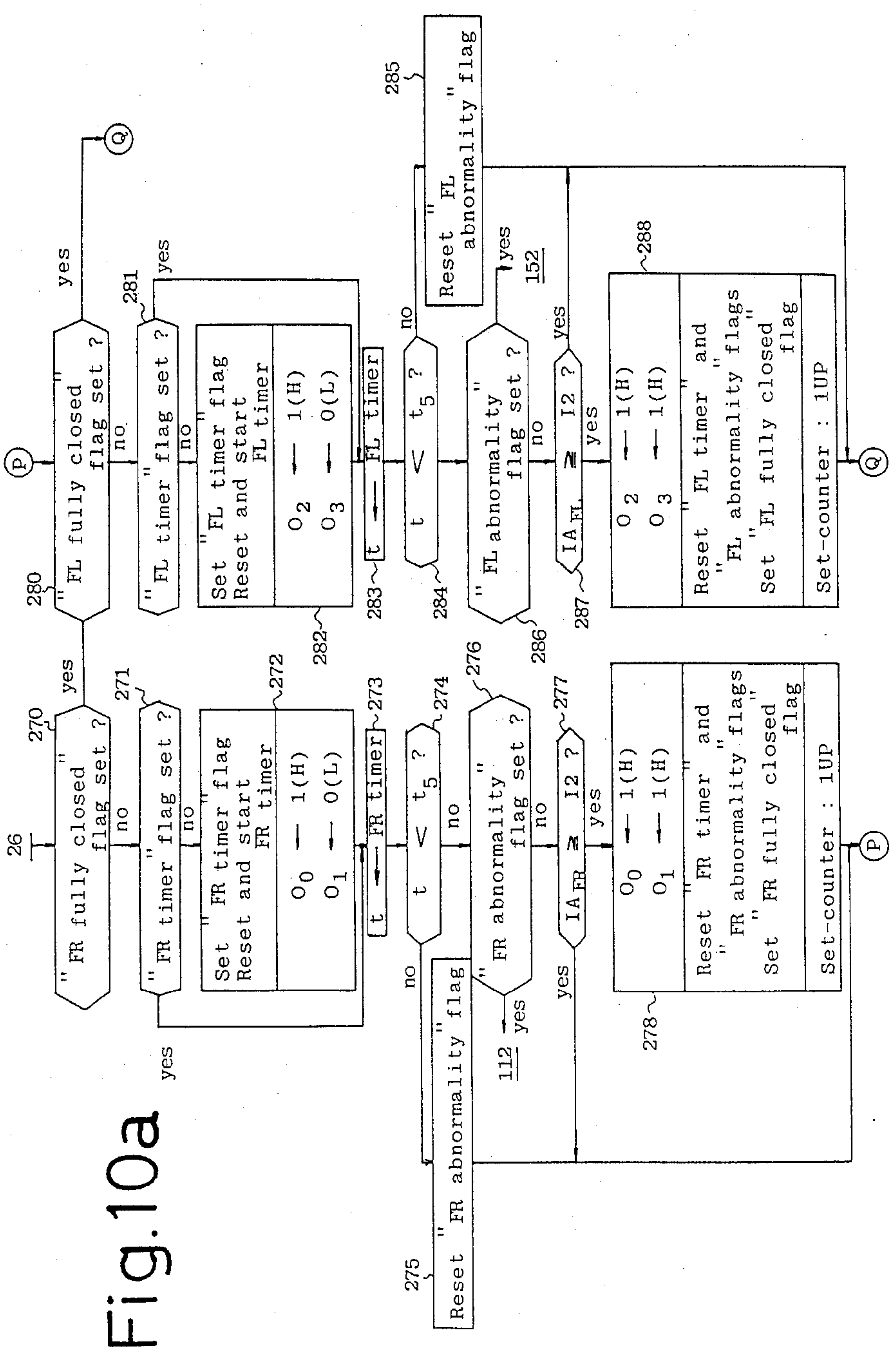
* and FIGS. 10*a* and 10*b* are flowcharts of modifications of the control operation by the microcomputer in a modified version of the invention.
Figure 10B:
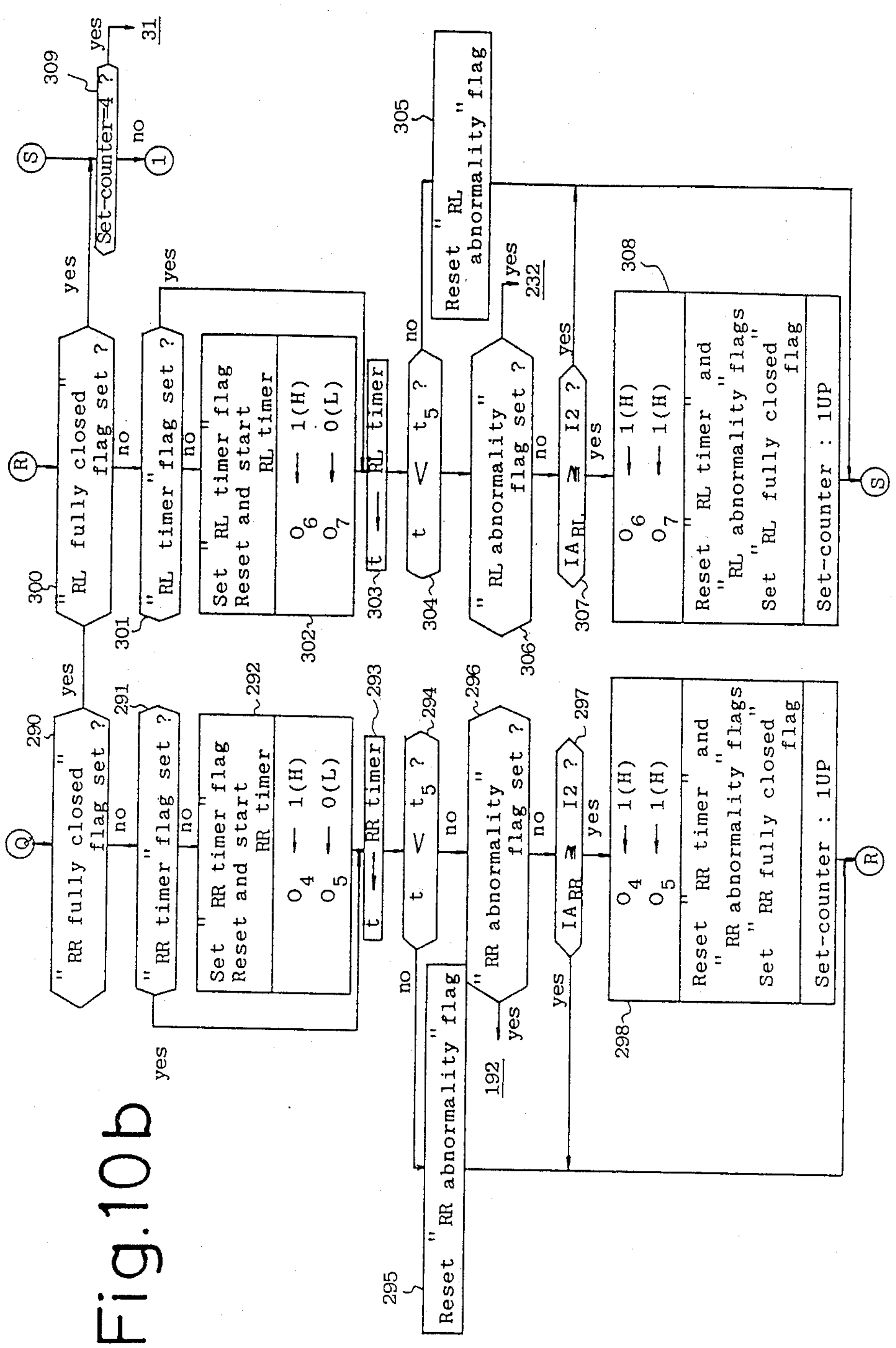

This modification is illustrated in FIGS. 10a and 10b, and a difference over the previous embodiment will now be described.

The control up to the point represented by S26 remains substantially the same as before. In this modification, a use is made of a set counter which counts the number of ". . . fully closed" flags which have been set. Accordingly, when "FR single operation" flag, "FL single operation" flag, "RR single operation" flag and "RL single operation" flag are set at S7 in FIG. 8a, this set counter is cleared. When the FR window opening/-closing control is executed and when "FR single operation" flag is set, the set counter is incremented by one at S105 (FIG. 8g) or S123 (FIG. 8h). If the corresponding control is executed when "FL single operation" flag is set, the set counter is incremented by one at S145 (FIG. 8i) or S163 (FIG. 8j). If the corresponding control is executed when "RR single operation" flag is set, the set counter is incremented by one at S185 (FIG. 8k) or S203 (FIG. 8l). If the corresponding control is executed when "RL single operation flag is set, the set counter is incremented by one at S225 (FIG. 8*m*) or S243 (FIG. 8*n*). The program proceeds from S26 to the flowchart shown in FIG. 10*a*.

At S270, "FR fully closed" flag is examined if it is set, and if it is not set, the following control is performed. Initially, at S272, "FR timer" flag is set, and FR timer is reset and started while establishing 1 (H level) and 0 (L level) at the output ports O0 and and O1, respectively, (thus energizing the motor $M_{FR}$ for rotation in the forward direction). At S273 and S274, the time during which the motor $M_{FR}$ is energized for rotation in the forward direction is determined, and if the rise time for the motor $M_{FR}$ in its rotation in the forwrad direction has not passed, the program passes from S274 to S275, thus proceeding to S280.

At S280, "FL fully closed" flag is examined, and if it is not set, the following control is performed. Initially, at S282, "FL timer" flag is set, and FL timer is reset and started while establishing 1 (H level) and 0 (L level) at the output ports O2 and O3, respectively, (thus energizing the motor $M_{FL}$ for rotation in the forward direction). At S283 and S284, the time during which the motor is energized for rotation in the forward direction is determined, and if the rise time for this motor has not passed, the program passes from S284 to S285, proceeding to S290 (FIG. 10*b*).

At S290, "RR fully closed" flag is examined, and if it is not set, the following control is performed. Initially, at S292, "RR timer" flag is set, and RR timer is reset and started while establishing 1 (H level) and 0 (L level) at the output ports O4 and O5, respectively (thus energizing the motor $M_{RR}$ for rotation in the forward direction). At S293 and S294, the time during which the motor is energized for rotation in the forward direction is determined, and if the rise time for this motor has not passed, the program passes from S294 to S295, thus proceeding to S300 shown in FIG. 10*b*.

At S300, "RL fully closed" flag is examined, and if this flag is not set, the following control is performed. Initially, at S302, "RL timer" flag is set, and the RL timer is reset and started while establishing 1 (H level) and 0 (L level) at the output ports O6 and O7, respectively, (thus energizing the motor $M_{RL}$ for rotation in the forward direction). At S303 and S304, the time during which this motor is energized for rotation in the forward direction is determined, and if the rise time for this motor has not passed, the program passes from S304 to S305, thus proceeding to S309.

The value in the set counter is examined at S309, and if this value is not equal to 4, the program proceeds to S2 in FIG. 8*a*. Subsequently, the program proceeds through S2 . . . S26, again entering the flowchart shown in FIG. 10*a*.

When the rise time for the motor has passed, a processing operation along a loop takes place while continuing the energization of the motor for rotation in the forward direction and while monitoring the motor current. If "FR abnormality" flag is set, the program then proceeds from S276 to S112 shown in FIG. 8*h*, thus energizing the motor $M_{FR}$ for the FR door for rotation in the reverse direction, as mentioned previously. Subsequently, the program branches from S276 in FIG. 10*a* to the abnormality processing until the FR window is fully opened and the lock current is detected for the motor $M_{FL}$. While not shown, in this instance, S276 is skipped over if "$MF_{FR}$" flag is set.

A similar operation takes place if "FL abnormality" flag, "RR abnormality" flag or "RL abnormality" flag is set. In each instance, if "$MS_{FL}$" flag, "$MS_{RR}$" flag or "$MS_{RL}$" flag is not set (not shown), the program branches from S286, S296, or S306, respectively, to the execution of the abnormality processing.

Each time the motor current becomes equal to or exceeds the lock current I2, the corresponding motor is deenergized. Specifically, if the motor $M_{FR}$ has locked, and the motor current exceeds I2, 1 (H level) is established at the output ports O0 and O1 at S278 to deenergize the motor, and "FR fully closed" flag is set while incrementing the set counter by one. If the motor $M_{FL}$ has locked, and the motor current exceeds I2, 1 (H level) is established at the output ports O2 and O3 at S288, thus deenergizing the motor and setting "FL fully closed" flag while incrementing the set counter by one. If the motor $M_{RR}$ has locked, and the motor current exceeds I2, 1 (H level) is established at the output ports O4 and O5 to deenergize the motor at S298 (FIG. 10*b*), and "RR fully closed" flag is set while incrementing the set counter by one. Finally, if the motor $M_{RL}$ has locked, and the motor current exceeds I2, 1 (H level) is established at the output ports O6 and O7 to deenergize the motor at S308, and "RL fully closed" flag is set while incrementing the set counter by one.

The failure-to-close preventing control is selectively executed while examining "FR fully closed" flag, "FL fully closed" flag, "RR fully closed" flag and "RL fully closed" flag.

When a window is fully closed, a corresponding ". . . fully closed" flag is set while simultaneously incrementing the set counter by one. Accordingly, when the four windows are all closed, the set counter has a count of 4 (as initially mentioned in the modification, the set counter is incremented by one when the window opening/closing control is executed in response to ". . . single operation" flag by considering it as representing the fully closed condition). The program then proceeds from S309 (FIG. 10*b*) to S31 shown in FIG. 8*a*. If the "standby" flag is now set, the program proceeds through S2-S3-S6-S8-S2- . . . as mentioned previously, thus establishing the standby mode.

With the described arrangement, a usual operation by the driver when he is getting out of the vehicle, namely, stopping the engine, withdrawing the ignition key, opening the door and closing and locking the door after he has got out of the vehicle, is effective to detect the stopped condition of the vehicle, which initiates the failure-to-close preventing control, without forcing any particular operation on the part of the driver. In this manner, the resulting operation is greatly simplified. On the other hand, if a driver has opened the window in order to prevent an excessive temperature rise before he gets out of the vehicle, the standby position is established under this condition, preserving the intent of the driver. If any window is forcibly opened during the time the vehicle is at rest, the alarm is activated to announce an abnormal condition, thus effectively preventing a casualty.

While the embodiment has been described above in connection with the window opening/closing control of the vehicle, it should be understood that the invention is not limited thereto, but is equally applicable in a variety of similar situations.

What is claimed is:

1. Drive control system for vehicle mounted, electrically driven devices comprising:

support means for supporting at least one vehicle mounted, electrically driven device in a movable manner;

a motor drive mechanism for driving the vehicle mounted device;

a motor driver for energizing an electric motor contained in the motor drive mechanism;

input means for inputting a drive command to the motor drive mechanism;

means for detecting when the vehicle mounted device has reached a limit position;

first detecting means for detecting if an ignition key is inserted in an associated receptacle of an ignition switch mounted on the vehicle;

second detecting means for detecting an opening or closing of a door of the vehicle;

and control means including means for controlling the energization of the motor through the motor driver in response to the input means and means for energizing the motor through the motor driver in response to the second detecting means indicating a closing of the door and the first detecting means indicating that the ignition key is not inserted until the position detecting means detects that the device has reached the limit position.

2. A drive control system according to claim 1 in which the control means further includes means for storing information indicating energization of the motor in response to the input means when the first detecting means indicates that the ignition key is not inserted, and said control means in the absence of said information energizes the motor through the motor driver until the position detecting means detects that the limit position is reached when the second detecting means indicates a closing of the door, and the first detecting means indicate that the ignition key is not inserted.

3. A drive control system according to claim 2, further including load detecting means for detecting a load on the motor to generate a detected load signal, the control means further includes means for comparing the detected load signal against a first value and de-energizing the motor when the detected load signal exceeds the first value.

4. A drive control system according to claim 3 in which the load detecting means comprises a resistor connected in a current loop which energizes the motor.

5. A drive control system according to claim 1, further including alarm means and alarm activating means, said alarm activating means energizing said alarm means whenever an induced current through said motor exceeds a second value and when said motor is not energized.

6. A drive control system for vehicle mounted, electrically driven devices comprising:

a plurality of support means for supporting a plurality of vehicle mounted, electrically driven devices each in a movable manner;

a plurality of electric motor drive mechanisms arranged to drive each associated vehicle mounted device;

a motor driver for independently energizing the electric motor of the respective motor drive mechanism;

input means for inputting a drive command to each of the motor drive mechanisms;

position detecting means for detecting that any one of the vehicle mounted devices has reached its limit position;

first detecting means for detecting that an ignition key is inserted into a receptacle of an ignition switch mounted on the vehicle;

second detecting means for detecting an opening or closing of a door of the vehicle;

and control means including means for controlling the energization of the motor through one of the motor drivers connected thereto in response to the drive command from the input means which selects a particular one of the motor drivers, and means for storing information indicating energization of at least one of the motors responsive to the input means when the first detecting means indicates that the ignition key is not inserted, said controlling means being operative in response to the absence of the storage to control the energization of the electric motor or motors except one which is energized when an engine key switch of the vehicle is off, through associated motor driver or drivers, until a corresponding one of the position detecting means has detected that the limit position is reached when the second detecting means indicate a closing of the door and when the first detecting means indicates that the ignition key is not inserted.

7. A drive control system according to claim 6, further including a plurality of load detecting means for detecting the load on each of the motors to generate a detected load signal, the control means further includes means for comparing the load detected signal against a given value and de-energizing the corresponding motor when the detected load signal exceeds the given value.

8. A drive control system according to claim 7 in which the load detecting means comprises a resistor connected in a current loop which energizes the respective motor.

9. A drive control system according to claim 6, further including alarm means and alarm activating means said alarm activating means energizing, said alarm means whenever an induced current through said motor exceeds a second given value and when said motor is not energized.

10. A drive control system for vehicle mounted, electrically driven devices comprising:

support means for supporting at least one vehicle mounted device in a movable manner;

an electric motor drive mechanism for driving the vehicle mounted device;

a motor driver for energizing an electric motor of the motor drive mechanism;

input means for inputting a drive command to the motor drive mechanism;

position detecting means for detecting the position of the vehicle mounted device;

status detecting means for determining a status change in a manner corresponding to a status of the vehicle;

control means for energizing the motor in response to an input from the input means when the status detecting means indicates the vehicle is not being operated and for de-energizing the motor if the detected position coincides with a standby position;

and standby position presetting means for presetting the vehicle mounted device to a standby position as it is positioned by the energization of the motor when the control means commands the motor driver to energize the motor in response to an output from the input means under the condition that the status detecting means indicates a given status of the vehicle.

11. A drive control system according to claim 10 in which the status detecting means comprises first detecting means for detecting that an ignition key is inserted into a receptacle of an ignition switch mounted on the vehicle, first storage means for storing information detected by the first detecting means, second detecting means for detecting an open or closed condition of a door of the vehicle, second storage means for storing information detected by the second detecting means, and first decision means for determining the presence of a first status in response to a detection by the first detecting means that the ignition key is not inserted when the first storage means stores information representing that the ignition key is inserted, and second decision means for determining the presence of a second status representing that the vehicle is not being operated in response to a detection by the first detecting means that the ignition key is not inserted when the first storage means stores information representing that the ignition key is inserted and in response to a detection by the second detecting means that the door is closed when the second storage means stores information indicating that the door of the vehicle is open.

12. A drive control system according to claim 11 in which the standby position presetting means presets the vehicle mounted device to the standby position as it is positioned by the energization of the motor which occurs by the motor driver for energizing the motor in response to an input from the input means when the status detecting means determines the presence of the first status.

13. A drive control system according to claim 12 in which the motor driver energizes the motor when the position detecting means indicates that the vehicle mounted device is out of the standby position and when the status detecting means determines the presence of the second status.

14. A drive control system according to claim 13, further including load detecting means for detecting the load on the motor to generate a detected signal, the control means including means for comparing the detected load signal against a first value and de-energizing the motor whenever the detected load signal exceeds the first value.

15. A drive control system according to claim 14 in which the load detecting means comprises a resistor connected in a current loop which energizes the motor.

16. A drive control system according to claim 10, further including alarm means and alarm activating means, said alarm activating means energizing said alarm means whenever an induced current through said motor exceeds a second value and when said motor is not energized.

17. A drive control system for vehicle mounted, electrically driven devices comprising:

a plurality of support means for supporting a plurality of vehicle mounted devices each in a movable manner;

a plurality of motor drive mechanisms for driving each of the vehicle mounted devices;

a motor driver for independently energizing the electric motor of the respective motor drive mechanism;

input means for inputting a drive command to each of the motor drive mechanisms;

position detecting means for detecting the position of each of the vehicle mounted devices;

status detecting means presenting a status change in a manner corresponding to a status of the vehicle;

control means including motor driver commanding means for commanding the energization of the motor associated with one of the vehicle mounted devices in response to an input from the input means, the position detecting means indicating that the vehicle mounted devices being out of a standby position when the status detecting means indicates the vehicle is not being driven, said motor driver commanding means subsequently commanding the motor driver to de-energize the motor when the position detecting means indicates that the position of the vehicle mounted device coincides with the standby position;

and standby position presetting means for presetting one of the vehicle mounted devices to a preselected standby position therefor as the vehicle mounted device is positioned by the energization of the electric motor when the control means commands the motor driver to energize such motor in response to an input from the input means and when the status detecting means indicates a given status of the vehicle.

18. A drive control system according to claim 17, further including load detecting means for detecting a load on the motor to generate a detected load signal, the control means further including means for comparing the detected load signal against a first value and de-energizing the motor whenever the detected load signal exceeds the first value.

19. A drive control system according to claim 18 in which the load detecting means comprises a resistor connected in a current loop which energizes the motor.

20. A drive control system according to claim 17, further including alarm means and alarm activating means, said alarm activating means energizing alarm means whenever an induced current through said motor exceeds a second value and when said motor is not energized.

21. A drive control system for vehicle mounted devices comprising:

a plurality of support means for supporting a plurality of vehicle mounted devices each in a movable manner;

a plurality of motor drive mechanisms for driving respective vehicle mounted devices;

a motor driver for independently energizing an electric motor of each of the motor drive mechanisms;

input means for inputting a drive command to each of the motor drive mechanisms;

position detecting means for detecting the position of each vehicle mounted device;

status detecting means detecting a status change in a manner corresponding to a status of the vehicle;

control means including motor driver commanding means for commanding the energization of the motor in response to an input from the input means, the control means being operative, when the position of the vehicle mounted devices is detected to be out of a standby position, to command the motor drivers to energize the associated motors in a sequential manner until there is no vehicle mounted device which is positioned out of the standby positio and subsequently command the motor drivers to de-energize the associated motor whenever the position detecting means indicate that the position of the vehicle mounted devices coincides with the standby position;

and standby position presetting means for presetting a vehicle mounted device to a standby position preselected therefor as it is positioned by the energization of the motor which occurs when the control means commands the motor driver to energize such motor in response to an input from the input means and when the status detecting means indicates a given status of the vehicle.

22. A drive control system according to claim 21 in which one of the vehicle mounted devices, which is located out of the standby position, is completely driven to the standby position before another one of such vehicle mounted devices begins to be driven.

23. A drive control system according to claim 22, further including load detecting means for detecting a load on the motor to generate a load detected load signal, the control means further including means for comparing the detected load signal against a first value and de-energizing the motor whenever the detected load signal exceeds the first value.

24. A drive control system according to claim 23 in which the load detecting means comprises a resistor connected in a current loop which energizes the motor.

25. A drive control system according to claim 22, further including alarm means and alarm activating means, said alarm activating means energizing said alarm means whenever an induced current through said motor exceeds a second value and when said motor is not energized.

26. A drive control system according to claim 21 in which after initiating the energization of the motor associated with one of the vehicle mounted devices, which are positioned out of the standby position, the energization of the motor associated with another one of such vehicle mounted devices is initiated after the rush-in current of the first mentioned motor has subsided.

27. A drive control system according to claim 26, further including load detecting means for detecting a load on the motor to generate a detected load signal, the control means further including means for comparing the detected load signal against a first value and de-energizing the motor when the detected load signal exceeds the first value.

28. A drive control system according to claim 27 in which the load detecting means comprises a resistor connected in a current loop which energizes the motor.

29. A drive control system according to claim 26, further including alarm means and alarm activating means, said alarm activating means energizing said alarm means whenever an induced current through said motor exceeds a second value and when said motor is not energized.

30. A drive control system for vehicle mounted device which is adapted to be electrically driven comprising:

support means for supporting the vehicle mounted device in a movable manner;

a motor drive mechanism for driving the vehicle mounted device;

a motor driver for energizing an electric motor of the motor drive mechanism;

means for commanding a drive to the motor drive mechanism;

control means for controlling the energization of the motor through the motor driver in response to a command from the commanding means;

alarm means;

and alarm activating means for energizing the alarm means whenever an induced current through the motor, when it is not energized, exceeds a given value.

* * * * *